(12) United States Patent
Kley

(10) Patent No.: US 10,438,703 B2
(45) Date of Patent: Oct. 8, 2019

(54) DIAMOND STRUCTURES AS FUEL CAPSULES FOR NUCLEAR FUSION

(71) Applicant: Sunshell LLC, Las Vegas, NV (US)

(72) Inventor: Victor B. Kley, Berkeley, CA (US)

(73) Assignee: SUNSHELL LLC, Las Vegas, NV (US)

( * ) Notice: Subject to any disclaimer, the term of this patent is extended or adjusted under 35 U.S.C. 154(b) by 0 days.

(21) Appl. No.: 14/862,951

(22) Filed: Sep. 23, 2015

(65) Prior Publication Data

US 2017/0287572 A1 Oct. 5, 2017
US 2018/0261336 A9 Sep. 13, 2018

Related U.S. Application Data

(63) Continuation of application No. 12/152,032, filed on May 10, 2008, now abandoned, which is a continuation of application No. 11/067,588, filed on Feb. 25, 2005, now abandoned.

(60) Provisional application No. 60/623,283, filed on Oct. 28, 2004, provisional application No. 60/622,520, filed on Oct. 26, 2004, provisional application No. 60/602,413, filed on Aug. 17, 2004, provisional application No. 60/557,786, filed on Mar. 29, 2004, provisional application No. 60/554,690, filed on Mar. 19, 2004, provisional application No. 60/553,911, filed on Mar. 16, 2004, provisional application No. 60/552,280, filed on Mar. 10, 2004, provisional
(Continued)

(51) Int. Cl.
G21B 1/19 (2006.01)
C01B 4/00 (2006.01)
C01B 32/25 (2017.01)

(52) U.S. Cl.
CPC ............. *G21B 1/19* (2013.01); *C01B 4/00* (2013.01); *C01B 32/25* (2017.08); *C01P 2004/32* (2013.01); *C01P 2006/44* (2013.01); *Y02E 30/16* (2013.01)

(58) Field of Classification Search
CPC ............. G21B 1/19; C01B 4/00; C01B 32/25
USPC ........................................ 376/100, 151, 152
See application file for complete search history.

(56) References Cited

U.S. PATENT DOCUMENTS 4,376,752 A * 3/1983 Nuckolls ................. G21B 1/19
376/152
4,380,855 A * 4/1983 Deckman ................ G21B 1/19
376/152
(Continued)

OTHER PUBLICATIONS

Archuleta, "Diamond and Diamond-Like Materials as Hydrogen Isotope Barriers", No. LA-UR-99-3018, Los Alamos National Lab, 1999. (Year: 1999).*
(Continued)

*Primary Examiner* — Jack W Keith
*Assistant Examiner* — Daniel Wasil
(74) *Attorney, Agent, or Firm* — Buchanan Ingersoll & Rooney PC

(57) ABSTRACT

Fuel capsules usable in inertial confinement fusion (ICF) reactors have shells made from materials having a diamond ($sp^3$) lattice structure, including diamond materials in synthetic crystalline, polycrystalline (ordered or disordered), nanocrystalline and amorphous forms. The interior of the shell is filled with a fusion fuel mixture, including any combination of deuterium and/or tritium and/or helium-3 and/or other fusible isotopes.

41 Claims, 24 Drawing Sheets

Related U.S. Application Data application No. 60/550,571, filed on Mar. 3, 2004, provisional application No. 60/547,934, filed on Feb. 25, 2004.

(56) References Cited

U.S. PATENT DOCUMENTS

| | | | | |
|---|---|---|---|---|
| 4,608,222 | A * | 8/1986 | Brueckner | G21B 1/23 376/152 |
| 5,320,877 | A * | 6/1994 | Nakaue | C23C 14/505 427/577 |
| 5,387,447 | A * | 2/1995 | Slutz | B21C 3/025 428/220 |
| 5,391,422 | A * | 2/1995 | Omori | B23B 27/148 428/156 |
| 5,501,909 | A * | 3/1996 | Higaki | C23C 16/27 428/131 |
| 5,648,139 | A * | 7/1997 | Sussmann | B21C 3/025 428/131 |
| 5,869,133 | A * | 2/1999 | Anthony | C23C 16/01 428/408 |
| 5,964,942 | A * | 10/1999 | Tanabe | C30B 29/04 427/577 |
| 6,596,225 | B1 * | 7/2003 | Pope | B22F 3/14 419/11 |
| 2001/0033899 | A1 * | 10/2001 | Noguchi | C23C 16/0254 427/460 |
| 2004/0071876 | A1 * | 4/2004 | Rakhimov | C23C 16/0236 427/249.8 |
| 2004/0219362 | A1 * | 11/2004 | Wort | A61F 2/30767 428/408 |
| 2005/0158200 | A1 * | 7/2005 | Pope | A61F 2/30767 419/11 |

OTHER PUBLICATIONS

Shultz, "Status of inertial fusion target fabrication in the USA", Fusion Engineering and Design 44 (1999) 441-448. (Year: 1999).*

Sweeney, "Ablation-driven targets for electron-beam fusion: Density problem with very low-Z ablators", Applied Physics Letters, vol. 29, No. 4, Aug. 15, 1976. (Year: 1976).*

Margevicius, "Effect of Crystallographic Texture on Sound Velocity Propagation in Polycrystalline Beryllium", Fusion Science and Technology, vol. 41, May 2002. (Year: 2002).*

Anders, "Ultrathin Diamond-Like Carbon Films Deposited by Filtered Carbon Vacuum Arcs", IEEE Transactions on Plasma Science, vol. 29, No. 5, Oct. 2001. (Year: 2001).*

Haan, "Update on Ignition Target Fabrication Specifications", Fusion Science and Technology, vol. 41, May 2002. (Year: 2002).*

Fu, "Patterning of diamond microstructures on Si substrate by bulk and surface micromachining", Journal of Materials Processing Technology 132 (2003) 73-81. (Year: 2003).*

Mauricio Pereira da Cunha, "HVPSAW Sensitivity to Film Properties for ZNO/Diamond/Si Structures", 2000 IEEE Ultrasonics Symposium, pp. 283-286. (Year: 2000).*

Morrison, "Growth of CVD diamond films over bio-medical materials", Diamond and Related Materials 5, No. 10 (1996): 1118-1126. (Year: 1996).*

Exhibit IA—Tillmanns, Dr. Haralds, "REACh, Contribution to the ongoing consultation on Risk Assessment of Nanotechnologies—A1.a" DG SANCO, PRO-Coaching GmbH (41 pages).

Exhibit 1B—Mott, P. H., et al. "Limits to Poisson's ratio in isotropic materials," Physical Review, Chemistry Division, Code 6120, Naval Research Laboratory, Washington DC, 2009.

Exhibit 2—"The CVD Diamond Booklet," Diamond Materials, Advanced Diamond Technology (29 pages).

* cited by examiner

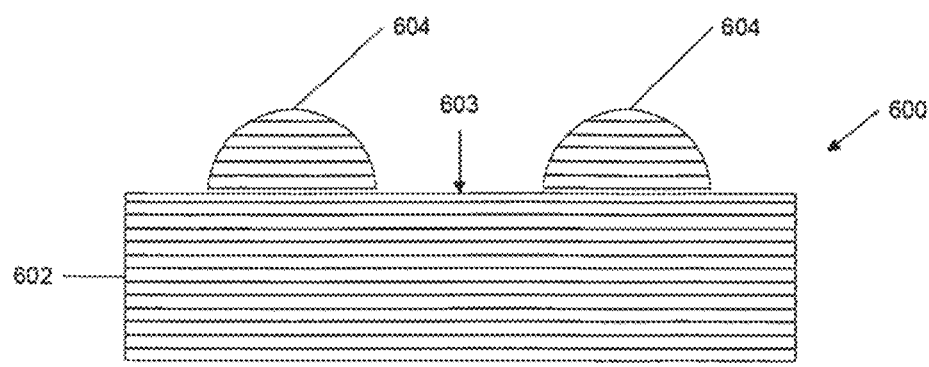
FIG. 6A
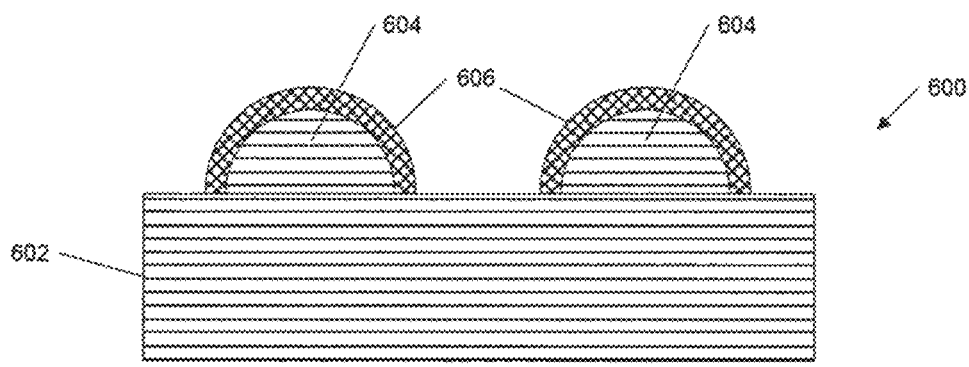
FIG. 6B
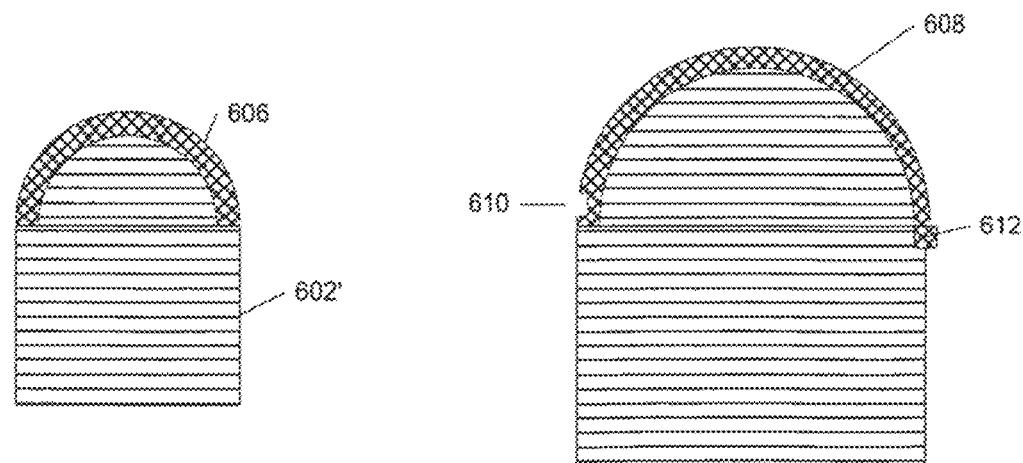
FIG. 6C
FIG. 6D

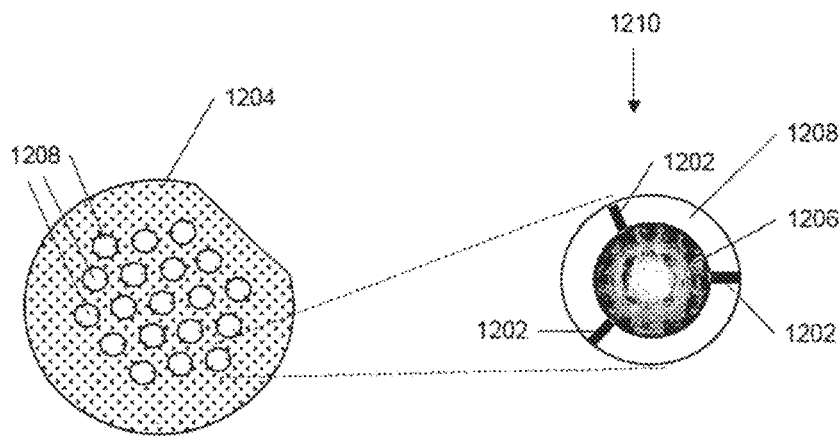
FIG. 12A
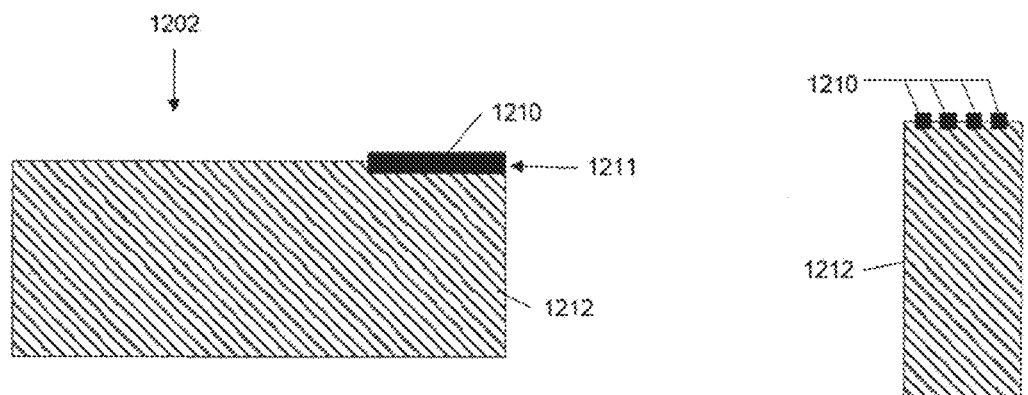
FIG. 12B
FIG. 12C
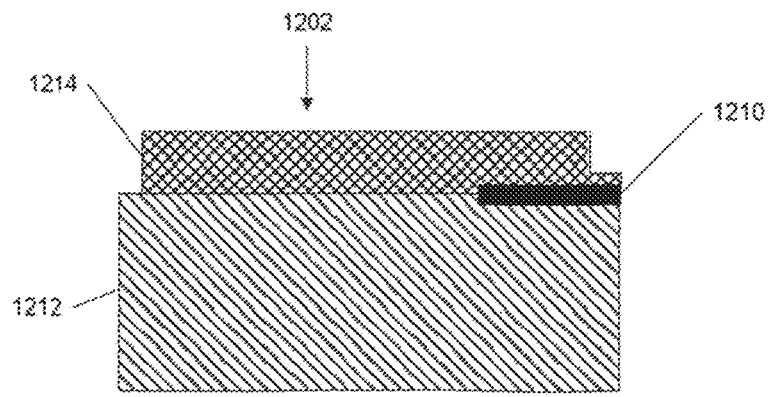
FIG. 12D

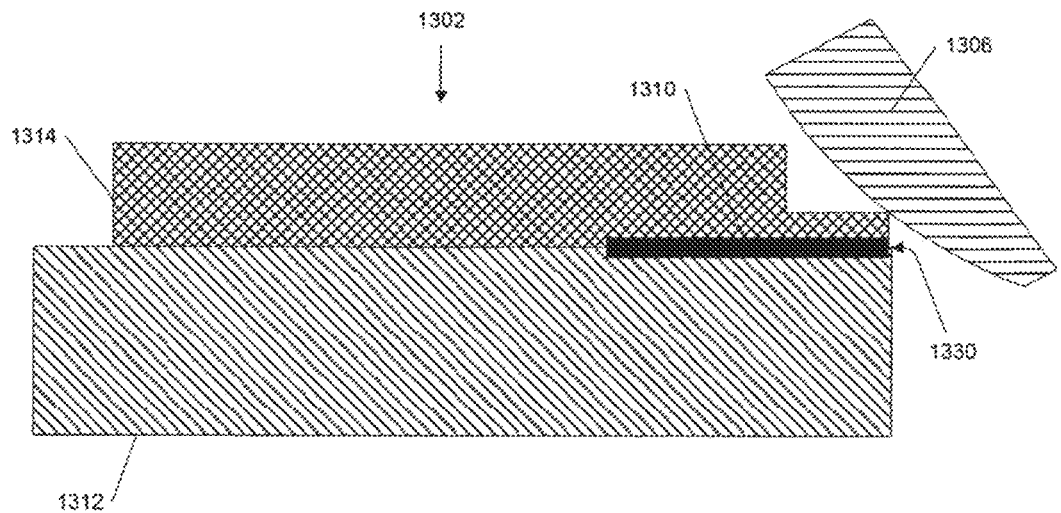
FIG. 13A
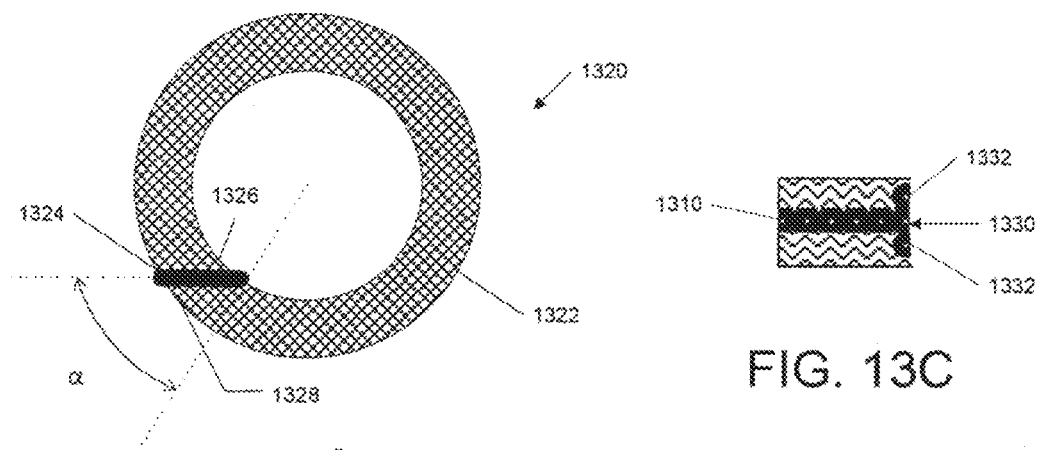
FIG. 13B
FIG. 13C

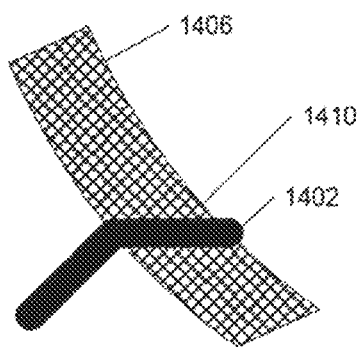
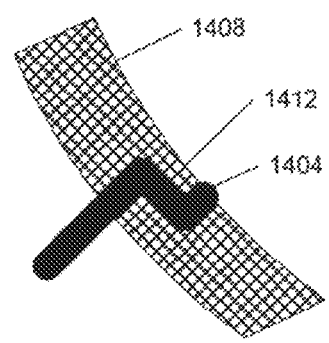
FIG. 14A　　　　　　　FIG. 14B
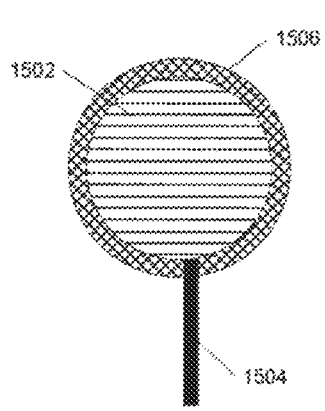
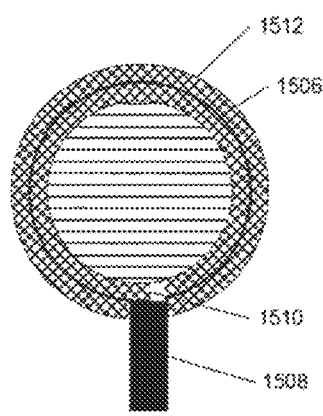
FIG. 15A　　　　　　　FIG. 15B
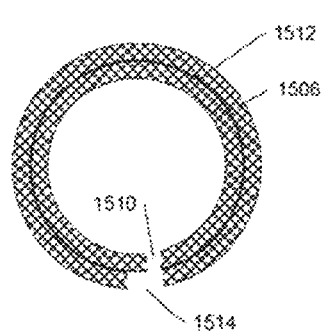
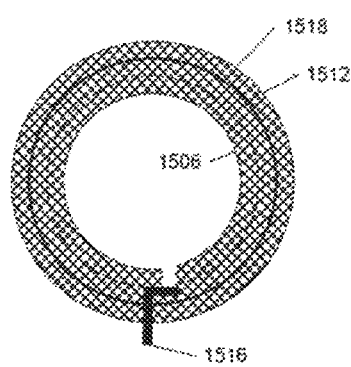
FIG. 15C　　　　　　　FIG. 15D

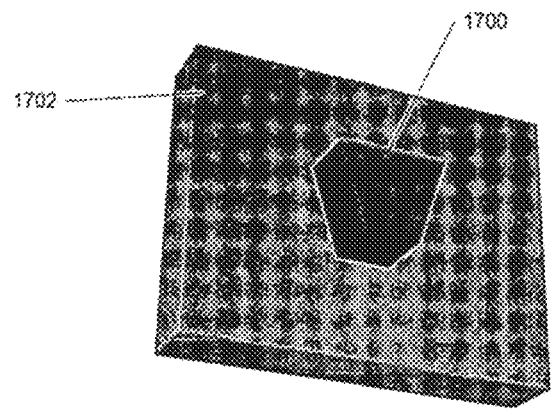
FIG. 17A
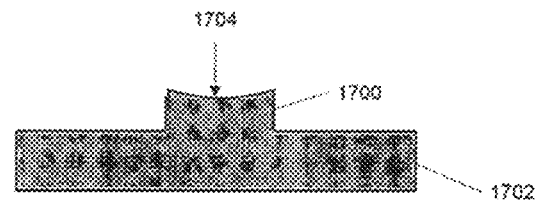
FIG. 17B
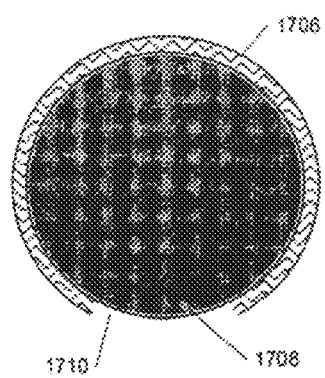 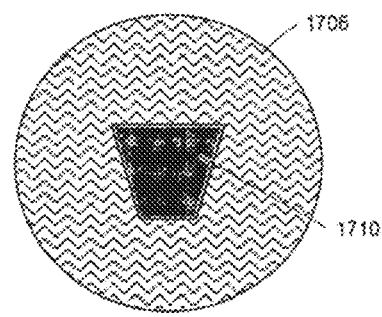
FIG. 17C  FIG. 17D

DIAMOND STRUCTURES AS FUEL CAPSULES FOR NUCLEAR FUSION

CROSS REFERENCE TO RELATED APPLICATIONS

This application is a continuation of U.S. patent application Ser. No. 12/152,032 filed May 10, 2008, now abandoned, which is a continuation of U.S. patent application Ser. No. 11/067,588 filed Feb. 25, 2005, now abandoned, the subject matter of which is incorporated herein by reference.

Application Ser. No. 11/067,588, in turn, claims the benefit under 35 U.S.C. § 119 of the following nine U.S. Provisional Applications:

U.S. Provisional Patent Application No. 60/547,934 filed Feb. 25, 2004, entitled "Diamond Molding of Small and Microscale Capsules";

U.S. Provisional Patent Application No. 60/550,571 filed Mar. 3, 2004, entitled "Diamond Molding of Small and Microscale Capsules";

U.S. Provisional Patent Application No. 60/552,280 filed Mar. 10, 2004, entitled "Diamond Molding of Small and Microscale Capsules";

U.S. Provisional Patent Application No. 60/553,911 filed Mar. 16, 2004, entitled "Diamond Molding of Small and Microscale Capsules";

U.S. Provisional Patent Application No. 60/554,690 filed Mar. 19, 2004, entitled "Diamond and/or Silicon Carbide Molding of Small and Microscale or Nanoscale Capsules and Hohlraums";

U.S. Provisional Patent Application No. 60/557,786 filed Mar. 29, 2004, entitled "Diamond and/or Silicon Carbide Molding of Small and Microscale or Nanoscale Capsules and Hohlraums";

U.S. Provisional Patent Application No. 60/602,413 filed Aug. 17, 2004, entitled for "Diamond and/or Silicon Carbide Molding of Small and Microscale or Nanoscale Capsules and Hohlraums";

U.S. Provisional Patent Application No. 60/622,520 filed Oct. 26, 2004, entitled "Diamond and/or Silicon Carbide Molding of Small and Microscale or Nanoscale Capsules and Hohlraums"; and U.S. Provisional Patent Application No. 60/623,283 filed Oct. 28, 2004, entitled "Diamond and/or Silicon Carbide Molding of Small and Microscale or Nanoscale Capsules and Hohlraums."

The respective disclosures of these applications, including any attachments and appendices thereto, are incorporated herein by reference for all purposes.

The following U.S. patents and patent applications, including any attachments and appendices thereto, are also incorporated herein by reference for all purposes:

U.S. Pat. No. 6,144,028, issued Nov. 7, 2000, entitled "Scanning Probe Microscope Assembly and Corresponding Method for Making Confocal, Spectrophotometric, Near-Field, and Scanning Probe Measurements and Forming Associated Images from the Measurements";

U.S. Pat. No. 6,252,226, issued Jun. 26, 2001, entitled "Nanometer Scale Data Storage Device and Associated Positioning System";

U.S. Pat. No. 6,337,479, issued Jan. 8, 2002, entitled "Object Inspection, and/or Modification System and Method";

U.S. Pat. No. 6,339,217, issued Jan. 15, 2002, entitled "Scanning Probe Microscope Assembly and Method for Making Spectrophotometries. Near-Field, and Scanning Probe Measurements";

U.S. Provisional Application No. 60/554,194, filed Mar. 18, 2004, entitled "Silicon Carbide Stabilizing of Solid Diamond and Stabilized Molded and Formed Diamond Structures";

U.S. patent application Ser. No. 11/067,517, filed on Feb. 25, 2005, entitled "Diamond Capsules and Methods of Manufacture";

U.S. patent application Ser. No. 11/067,521, filed on Feb. 25, 2005, entitled "Methods of Manufacturing Diamond Capsules";

U.S. patent application Ser. No. 11/067,609, filed on Feb. 25, 2005, entitled "Methods of Manufacturing Diamond Capsules"; and U.S. patent application Ser. No. 11/067,609, filed on Feb. 25, 2005, entitled "Apparatus for Modifying And Measuring Diamond and Other Workplace Surfaces with Nanoscale Precision."

RELATED DOCUMENTS INCORPORATED BY REFERENCE

The following documents provide background information related to the present application and are, incorporated herein by reference:

[KOMA] R. Komanduri et al., "Finishing of Silicon Nitride Balls," Oklahoma State University, Web Page at asset (dot) okstate (dot) edu (slash) asset (slash) finish.htm (updated Aug. 21, 2003);

[LIND] J. Lindl, "Development of the Indirect-Drive Approach to Inertial Confinement Fusion and the Target Physics Basis for Ignition and Gain," published in Physics of Plasmas, November 1995;

[PHYS] Physik Instruments (PI) GmbH, "Datasheets: Options and Accessories," Web page at www (dot) physikinstrumente (dot) de (slash) products (slash) prdetail.php?secid=1-39;

[NOOL] Nonlinear Optics and Optoelectronics Lab, University Roma Tre (Italy), "Germanium on Silicon Near Infrared Photodetectors," Web page at optow (dot) ele (dot) uniroma3 (dot) it (slash) optow_2002 (slash) labs (slash) SiGeNIR files (slash) SiGeNIR.htm;

[SAIN] Saint-Gobain Ceramics, "ASTM F2094 $Si_3N_4$ Cerbec Ball Specifications," Web page at www (dot) cerbec (dot) com (slash) TechInfo (slash) TechSpec.asp;

[STOL] C. R. Stoldt et al., "Novel Low-Temperature CVD Process for Silicon Carbide MEMS" (preprint), C. R. Stoldt, C. Carraro, W. R. Ashurst, M. C. Frits, D. Gao, and R. Maboudian, Department of Chemical Engineering, University of California, Berkeley

[SULL] J. P. Sullivan et al., "Amorphous Diamond MEMS and Sensors," Sandia National Labs Report SAND2002-1755 (2002); and

[UWST] University of Wisconsin-Stout-Statics and Strength of Material, (Physics 372-321), Topic 6.5: Pressure Vessels—Thin Wall Pressure Vessels, Web page at physics (dot) uwstout (dot) edu (slash) StatStr (slash) Statics (slash) index.htm.

Copies of these documents are being made of record in the present application.

TECHNICAL FIELD

The present invention relates in general to diamond structures, and in particular to diamond structures that are usable as fuel capsules for nuclear fusion reactors.

BACKGROUND

Nuclear fusion occurs when two relatively light atomic nuclei (e.g., isotopes of hydrogen, helium or lithium) are brought into such close proximity that they fuse Into a single heavier nucleus, releasing tremendous amounts of energy in the process. For over half a century, the theoretical potential of nuclear fusion as a clean, reliable, and virtually inexhaustible energy source has been known and has motivated an array of research and development projects.

Practical fusion technology, however, remains elusive. Fusing two nuclei requires confinement; i.e., the nuclei must be held in very close proximity to each other for a period of time sufficient to allow the fusion reaction to occur. Confinement requires overcoming the Coulomb barrier that causes the positively charged nuclei to repel each other. The most common approach to overcoming this barrier involves directing the nuclei toward each other with sufficient momentum to penetrate the Coulomb barrier and achieve confinement.

Over the years, various techniques have been tried for imparting the necessary momentum to the nuclei. For instance, inertial confinement fusion (ICF) is being investigated at various research centers, including the National Ignition Facility (NIF). In ICF, the fusion fuel (typically a deuterium-tritium mixture) is placed within a spherical capsule that has a thin outer shell (called an ablator). An inner shell made of the fusion fuel in a solid or liquid state usually lines the inner wall of the ablator, and the interior of the inner shell is filled with a low-pressure gas of the fusion fuel. When heated, the ablator rapidly expands outward, driving the inner shell inward and compressing the fuel. Under the right conditions, the compressed fuel forms a central "hot spot/" containing 2-5% of the fuel, in which confinement is attained. Heat released from the resulting fusion reactions in the hot spot, then radiates outward to create an expanding thermonuclear burn front.

Heating of the ablator can be done directly or indirectly. In "direct drive" ICF, a conventional energy source, such as a laser or ion beam, is directed onto the capsule surface to heat and expand the ablator material, driving an implosion of the fuel. This approach demands very uniform illumination of the capsule surface to avoid hydrodynamic instability that would preclude confinement or the development of a sustained burn front. In "indirect drive" ICF, the fuel-containing capsule is placed in a "hohlraum," a symmetric cavity with walls made of a high-Z material such as gold, lead, or uranium that acts as a blackbody radiator. Laser or ion beams are directed onto the walls of the hohlraum, which radiates x-rays into the cavity. The x-rays heat and expand the ablator material, driving an implosion of the fuel. The use of a hohlraum reduces sensitivity to hydrodynamic instability, resulting in relaxed requirements for uniform illumination. Nevertheless, a symmetric implosion of the fuel is crucial.

Thus, capsule design is an important factor in ICF. For example, inner shells with a large radius and small thickness achieve high implosion velocities. In addition, nonuniformities in the ablator, and to a lesser extent in the inner shell, can result in asymmetry in the implosion so that confinement does not occur.

Various capsule dimensions and compositions have been proposed and studied. For example, one existing capsule design provides a plastic (CH) ablator with an outer radius of about 1.1 millimeters (mm) and a thickness of about 0.15 mm. The inner shell was made of solid deuterium-tritium (DT) ice about 80 micrometers (μm) thick; the interior was filled with DT gas at a pressure of 0.3 mg/cm$^3$ at a temperature of about 4 K. Another capsule had similar dimensions, but the ablator was made of beryllium doped with sodium and bromine. Other capsule designs use glass or silicon dioxide microballoons with diameters on the order of 150 and wall thicknesses on the order of 5-10 μm as ablators.

In practice, existing capsules have generally not produced satisfactory results. Typical problems include nonuniformity in the ablator thickness or composition, as well as deviations from sphericity and defects in the surface finish of the ablator. Any of these problems can lead to asymmetry in the implosion of the fuel. In addition, while a relatively thin ablator is generally desirable, the ablator needs to be thick enough to resist the pressure of the fuel inside, and the strength of the ablator material can be a limiting factor on the density of the fuel.

It would therefore be desirable to provide an improved fuel capsule for an ICF reactor.

SUMMARY

Embodiments of the present invention provide fuel capsules usable in inertial confinement, fusion (ICF) reactors. The capsules have shells made from diamond materials, including crystalline, polycrystalline (ordered or disordered), nanocrystalline, and amorphous diamond. As used herein, "diamond" refers generally to any material having a diamond lattice structure on at least a local scale (e.g., a few nanometers), and the material may be based on carbon atoms, silicon atoms, silicon carbide, or any other atoms capable of forming a diamond lattice. The interior of the shell can be filled with a fusion fuel mixture, including any combination of deuterium and/or tritium and/or helium-3 and/or other fusible isotopes. Other embodiments of the invention provide methods for manufacturing diamond shells and for filling diamond shells with a fusion fuel mixture.

According to one aspect of the invention, a capsule has a shell made of a diamond material, the shell defining an interior region. A fusion fuel mixture is contained within the interior region of the shell, and the capsule is usable within an inertial confinement fusion reactor. The shell, may be made of various types of diamond material including polycrystalline diamond material (which may have oriented or disoriented crystal grains), nanocrystalline diamond material, or amorphous diamond material. The diamond material may be a carbon-based diamond material, a silicon based diamond material, or any other material with atoms arranged in a diamond lattice.

Various fusion fuel mixtures may be used. In one embodiment, the fusion mixture includes deuterium ($^2$H) and/or tritium ($^3$H) and/or helium-3 ($^3$He). In another embodiment, the fusion fuel mixture includes helium-3 deuteride. A solid form of the fusion fuel mixture may line an inner wall of the shell, and/or a gas form of the fusion fuel mixture may fill the interior. The gas form of the fusion fuel mixture can be held at a pressure higher than an ambient pressure.

In preferred embodiments, the shell is substantially spherical. For instance, local deviations from smoothness on the inner and/or outer surfaces of the shell can be controlled to be less than about 4 nm.

In some embodiments, the shell has an access port therethrough. A valve may be disposed in the shell and adapted to prevent a fluid within the capsule from escaping through the access port when the valve is closed. The valve can be, for instance, a deformable flap of material or a displaceable tapered filament.

In some embodiments, the diamond material includes a dopant. The dopant may have various effects, such as increasing an electrical conductivity of the diamond material, modifying an electromagnetic absorption property of the diamond material, and/or modifying a thermal property of the diamond material. The dopant can be disposed nonuniformly in the diamond material such that a first region of the shell has a higher concentration of the dopant than a second region of the shell, thereby imparting nonuniform properties to the shell.

In some embodiments, a layer of a coating material is disposed on an outer wall of the shell. The coating layer can have small thickness variations forming a capsule identification pattern. Examples of coating materials include but are not limited to silicon, germanium, silicon carbide, silicon dioxide, silicon fluoride, magnesium fluoride, silicon nitride, titanium, titanium carbide, titanium dioxide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, and aluminum oxide.

In some embodiments, the shell comprises two substantially hemispherical shell sections. The shell sections may be connected by complementary latch members located near respective peripheral edges of the shell sections. Alternatively, the shell sections may be connected by an interference member located near a peripheral edge of one of the shell sections. In another embodiment, adjacent shell sections are connected by a bonding material disposed between respective peripheral edge surfaces of the adjacent shell sections. The bonding material may include an adhesion layer, a coupling layer, and a bondable layer; or silicon and spin on glass; or a noble gas at a low temperature; or other materials.

According to another aspect of the present invention, a method for making and filling a capsule includes aligning a plurality of shell sections made of a diamond material and joining the plurality of shell sections together at respective peripheral edges thereof to form a capsule shell. The shell sections are joined in an atmosphere containing a fusion fuel mixture such that the capsule shell contains at least some of the fusion fuel mixture. The sections may be hemispherical or may have other shapes.

In one embodiment, joining is performed in a low-temperature environment. Respective peripheral edges of the shell sections are held in proximity to each other such that a joint area is defined, and a noble gas is supplied to the joint area, via a heated passage. The low temperature is sufficiently low that the noble gas condenses in the joint area.

In another embodiment, the shell sections are subjected to machining, chemically modifying, polishing, lapping, or grinding to form complementary latch or interference members therein, and the shell sections are joined by aligning the shell sections such the complementary latch or interference members engage.

In still another embodiment, the shell sections are joined by a process that includes creating a temperature difference between two of the shell sections such that one of the shell sections is warmer than the other. An interference member at a peripheral edge of the warmer one of the shell sections is overlapped with a peripheral edge of the other one of the shell sections, and the temperature difference is reduced while holding the shell sections in overlapping relation to each other.

In a further embodiment, a bonding agent is applied to a peripheral edge of at least one of the shell sections, and the peripheral edge with the bonding agent is held in contact with a peripheral edge of another of the shell sections so that a bond forms, thereby joining the shell sections. Applying the bonding agent may include: applying an adhesion layer, a coupling layer, and a bondable layer or applying a silicon sputter and a spin on glass. In some embodiments, the bonding agent includes at least one of germanium, antimony, tellurium, astatine, polonium, bismuth, and/or arsenic, including alloys thereof.

In some embodiments, the shell sections are formed by growing the diamond material on a mold substrate. The mold substrate advantageously includes surface features, each surface feature conforming to a shell section shape, and the diamond material is grown over the surface features such that the diamond material conforms to the surface features. For example, a surface feature can be convex and substantially hemispherical or concave and substantially hemispherical. At least one of the surface features may also define a latch or interference member at a peripheral edge of one of the shell sections. After growing the shell sections, they can be removed from the mold substrate, e.g., by wet or dry etching of the mold substrate material.

According to still another aspect of the invention, a method for making a capsule includes growing a shell of a diamond material over a form substrate such that the shell covers all of the form substrate. An opening is formed through the shell, and the form substrate is removed through the opening. The capsule is then filled with a fusion fuel mixture.

According to yet another aspect of the invention, a method for making a capsule includes growing a shell of a diamond material over a form substrate such that the shell covers most or ail of the form substrate. The substrate is removed through an opening in the shell. An access port is formed through the shell, and the shell is filled with a fusion fuel mixture via the access port.

The access port can be formed in various ways. In one embodiment, one or more pins are held in contact with the form substrate during the act of growing the shell, and after growing the shell, the one or more pins are separated from the form substrate, thereby opening the access port. The pins can include a tube of a material different from the diamond material of the shell, and separating the one or more pins may include etching away the tube.

In other embodiments, the method also includes forming, in the shell, a valve member operable to open or close the access port. For instance, the access port and the valve member can both be formed by holding a pin in contact with the form substrate during the act of growing the shell, with the pin being held such that an access port with a deformable flap is formed in the shell. After growing the shell, the pin is removed, and the valve member includes the deformable flap.

Alternatively, the access port and the valve member can be formed by holding a first structure in contact with the form substrate during a first phase of growing the shell, thus creating an opening in the shell. After the first phase, the first structure is replaced with a second structure and a second phase of the act of growing is performed. The second structure substantially covers and extends beyond the opening in the shell created by the first structure.

In still another embodiment, the access port and the valve member can be formed by a process that includes coating a tapered filament made of the diamond material with a material other than the diamond material. An end of the coated filament is held in contact with the form substrate during the act of growing the shell. After the act of growing the shell, the coating is removed from the filament, so that the filament is displaceably held in the shell and operable as the valve member.

A capsule with a valve can be filled in various ways. In one embodiment, the capsule is placed into an environment containing the fusion fuel mixture at a high pressure and held there until a pressure equilibrium is reached between the capsule and the environment. After the pressure equilibrium is reached, the capsule environment can be modified (e.g., by lowering the external pressure) such that the pressure of the fluid on the valve member closes the access port.

In any of the above methods, various fusion fuel mixtures can be used. In one embodiment, the fusion fuel mixture includes deuterium ($^2$H) and/or tritium ($^3$H) and/or helium-3 ($^3$He). In another embodiment, the fusion fuel mixture includes helium-3 deuteride.

In any of the above methods, the shell may be made of various diamond materials, including polycrystalline diamond, nanocrystalline diamond, and/or amorphous diamond. The shell can be substantially spherical, and local deviations from smoothness on the inner and/or outer surfaces of the shell section may be controlled to be less than about 4 nm.

Diamond materials can be grown using various processes, including a chemical vapor deposition process, a plasma enhanced chemical vapor deposition process, a hot wire diamond growth process, or a laser induced amorphous diamond growth process. In some embodiments, a dopant is introduced into the diamond material during the growing step. Examples of suitable dopants include but are not limited to astatine, polonium, americium, antimony, bismuth, arsenic, germanium, iodine, tellurium, selenium or bromine. In some embodiments, at least a portion of the diamond material is coated or implanted with one or more other materials.

According to a further aspect of the present invention, a method of filling a capsule with a fusion fuel mixture includes forming an access port in a shell of the capsule, the shell being made of a diamond material, and filling the capsule with the fusion fuel mixture in a fluid form via the access port. After the capsule is filled, the access port can be closed.

Various fusion fuel mixtures can be used. In one embodiment, the fusion fuel mixture includes deuterium ($^2$H) and/or tritium ($^3$H) and/or helium-3 ($^3$He). In another embodiment, the fusion fuel mixture includes helium-3 deuteride.

Many techniques can be used to close the access port. In one embodiment, closing the access port includes inserting a plug into the access port. In another embodiment, closing the access port includes growing the diamond material to cover the access port.

Access ports can be formed in various ways. In one embodiment, forming the access port includes using an energetic beam of charged particles, a laser, or machining. In another embodiment, forming the access port includes coating the shell with an etch resist; patterning the etch resist to define a location of the access port; and etching the shell at the location of the access port to create an opening through the shell.

According to a still further aspect of the invention, a method of filling a capsule with a fusion fuel mixture includes placing a capsule into an environment containing the fusion fuel mixture in a fluid state and maintaining the environment at a suitable temperature and pressure to induce diffusion of the fusion fuel mixture into an interior region of the capsule. After a period of time, the environment can be modified to a different temperature and/or pressure such that diffusion of the fusion fuel mixture out of the capsule is inhibited.

Various fusion fuel mixtures can be used. In one embodiment, the fusion fuel mixture includes deuterium ($^2$H) and/or tritium ($^3$H) and/or helium-3 ($^3$He). In another embodiment, the fusion fuel mixture includes helium-3 deuteride.

In some embodiments, the temperature of the capsule or the environment can be altered so as to control a pressure of the fusion fuel mixture within the capsule. In other embodiments, a pressure of the fusion fuel mixture within the capsule is controlled by controlling a time period during which diffusion of the fusion fuel mixture takes place.

According to another aspect of the present invention, a system for inducing nuclear fusion includes a capsule. The capsule has a diamond shell defining an interior region and a fusion fuel mixture contained in the interior region. The capsule is disposed within a target region having an energy density sufficient to induce an expansion of the shell and an implosion of the plurality of fusion fuel atoms. Various fusion fuel mixtures can be used. In one embodiment, the fusion fuel mixture includes deuterium ($^2$H) and/or tritium ($^3$H) and/or helium-3 ($^3$He). In another embodiment, the fusion fuel mixture includes helium-3 deuteride. The fusion fuel mixture may be maintained in various states including solid and/or liquid and/or gas states.

In preferred embodiments, a hohlraum substantially encloses the target region and is configured to radiate x-rays into the target region. An energy source is configured to direct energy toward the hohlraum. The energy source may include, e.g., a laser generator or an ion beam generator.

According to yet another aspect of the invention, a method for inducing nuclear fusion includes creating a region of high energy density and placing in the region a capsule having a diamond shell defining an interior region and a fusion fuel mixture contained in the interior region. The energy density in the region is made sufficiently high to induce an expansion of the diamond shell and an implosion of the plurality of fusion fuel atoms. The region of high energy density can be created inside a hohlraum, e.g., by directing one or more laser beams onto a wall of the hohlraum or directing one or more ion beams into the hohlraum.

Various fusion fuel mixtures can be used. In one embodiment, the fusion fuel mixture includes deuterium ($^2$H) and/or tritium ($^3$H) and/or helium-3 ($^3$He). In another embodiment, the fusion fuel mixture includes helium-3 deuteride. The fusion fuel mixture may be maintained in various states including solid and/or liquid and/or gas states.

The following detailed description together with the accompanying drawings will provide a better understanding of the nature and advantages of the present invention. This summary does not purport to define the invention. The invention is defined by the claims.

BRIEF DESCRIPTION OF THE DRAWINGS

FIGS. 6A-6M are cross-sectional views of capsule structures at various stages of the process of FIG. 5;

FIGS. 12A-12I are views of a diamond capsule and growth apparatus at various stages of the process of FIG. 11;

FIGS. 13A-13C are views of an access port structure with an integral valve member according to an embodiment of the present invention;

FIGS. 14A and 14B are cross-sectional views of access port structures with integral valve members according to further embodiments of the present invention;

FIGS. 15A-15F are cross-sectional views of capsule structures at various stages of a process for forming a capsule with an integral valve according to an embodiment of the present invention;

FIGS. 17A-17F are perspective and cross-sectional views of a capsule and support structures at various stages of a process for forming a capsule according to another embodiment of the present invention;

DETAILED DESCRIPTION

Embodiments of the present invention provide fuel capsules usable in inertial confinement fusion (ICF) reactors. The capsules have shells made from diamond materials, including crystalline, polycrystalline (ordered or disordered), nanocrystalline, and amorphous diamond. As used herein, "diamond" refers generally to any material having a diamond lattice structure on at least a scale (e.g., a few nanometers), and the material may be based on carbon atoms, silicon atoms, silicon carbide, or any other atoms capable of forming a diamond lattice. The interior of the shell can be filled with a fusion fuel mixture, including any combination of deuterium and/or tritium and/or helium-3 and/or other fusible isotopes. Other embodiments of the invention provide methods for manufacturing diamond shells and for filling diamond shells with a fusion fuel mixture.

I. CAPSULE STRUCTURES

A. Capsule Shell

As used herein, the term "capsule" refers to any three-dimensional object having a shell with an identifiable inner wall that substantially encloses an interior region. For use in fusion applications, the interior of the shell is advantageously filled with "fusion fuel," which may be in solid, liquid, gas or other states. Examples of suitable fusion fuels are described below.

Figure 1:
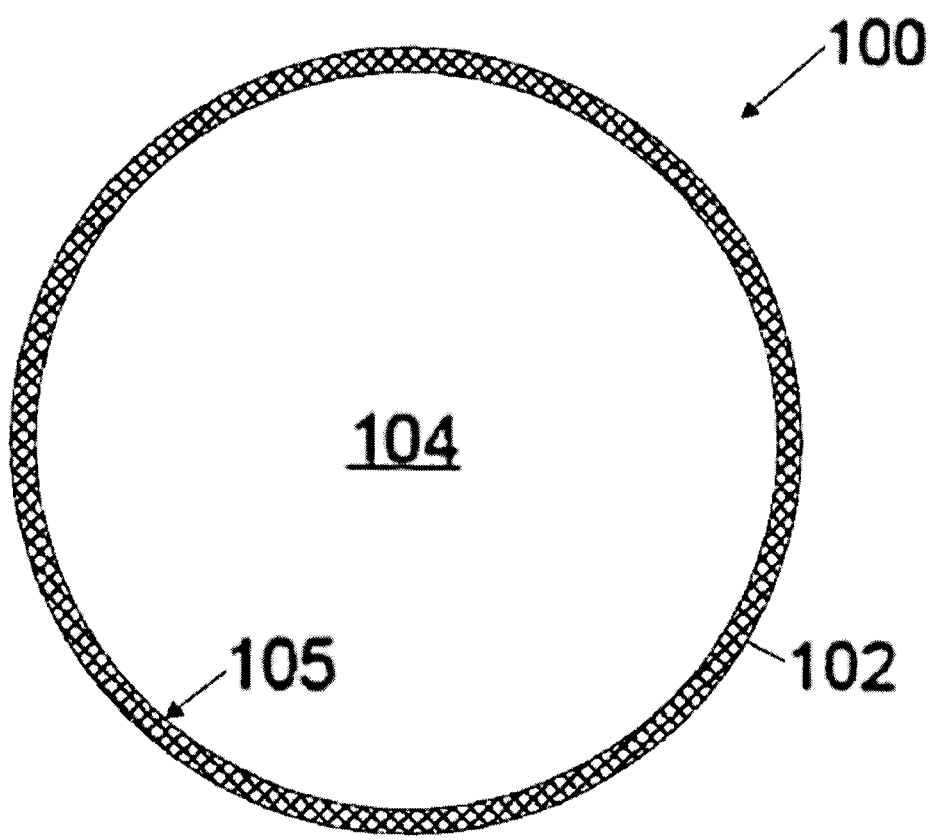
FIG. 1 is a cross-sectional view of a spherical capsule according to an embodiment of the present invention.

FIG. 1 is a cross-sectional view of one embodiment of a spherical capsule 100 having a diamond shell 102 that is thin compared to the overall dimension of the capsule. Shell 102 is advantageously of uniform thickness, and its inner wall 105 defines an interior region 104. Like all drawings herein, FIG. 1 is not to scale, and different embodiments may be of different sizes; e.g. the shell may have a diameter (measured at the outer surface of the shell) with a length anywhere between about 20 microns and about 1 meter. In one embodiment, the outer diameter of capsule 100 is 2 millimeters (mm), the inner diameter is 1.850 mm, and the shell thickness is 75 micrometers (μm). In preferred embodiments, the shell thickness is uniform to within 50 to 100 nanometers (nm) to insure the concentricity of the inner and outer capsule walls.

Figure 2A:
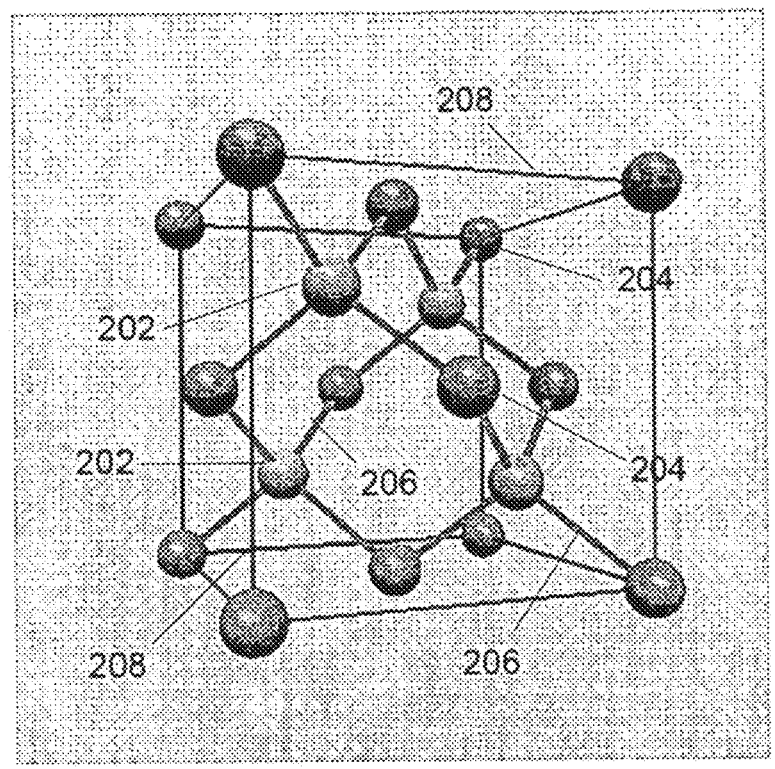
FIGS. 2A and 2B are schematic illustrations of diamond and graphite atomic lattices, respectively.

In some embodiments, diamond shell 102 is made of crystalline diamond. As is well known in the art, a crystal is a solid material consisting of atoms arranged in a lattice, i.e., a repeating three-dimensional pattern. In crystalline diamond, the lattice is a diamond lattice 200 as shown in FIG. 2A. Diamond lattice 200 is made up of atoms 202 connected by $sp^3$ bonds 206 in a tetrahedral configuration. (Lines 208 are visual guides indicating edges of a cube and do not represent atomic bonds.) As used herein, the term "diamond" refers to any material having atoms arranged in a diamond lattice as shown in FIG. 2A and is not limited to carbon atoms or to any other particular atoms. Thus, a "diamond shell" may include predominantly carbon atoms, silicon atoms, and/or atoms of any other type(s) capable of forming a diamond lattice, and the term "diamond" as used herein is not limited to carbon-based diamond.

In other embodiments, diamond shell 102 is an imperfect crystal. For example, the diamond lattice may include defects, such as extra atoms, missing atoms, or dopant or impurity atoms of a non-majority type at lattice sites; these dopant or impurity atoms may introduce non-$sp^3$ bond sites in the lattice, as is known in the art. Dopants, impurities, or other defects may be naturally occurring or deliberately introduced during fabrication of shell 102.

In still other embodiments, diamond shell 102 is made of polycrystalline diamond. As is known in the art, polycrystalline diamond includes multiple crystal grains, where each grain has a relatively uniform diamond lattice, but the grains do not align with each other such that a continuous lattice is preserved across the boundary. The grains of a polycrystalline diamond shell 102 might or might not have a generally preferred orientation relative to each other, depending on the conditions under which shell 102 is fabricated. In some embodiments, the size of the crystal grains can be controlled so as to form nanoscale crystal grains; this form of diamond is referred to as "nanocrystalline diamond." For example, the average value of a major axis of the crystal grains in nanocrystalline diamond can be made to be about 100 nm or less.

Figure 2B:
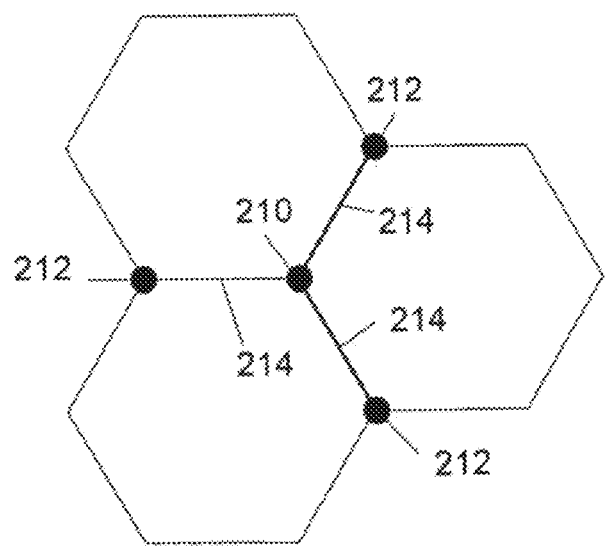

In still other embodiments, diamond shell 102 is made of amorphous diamond. Amorphous diamond, as described in above-referenced document [SULL], does not have a large-scale diamond lattice structure but does have local (e.g., on the order of 10 nm or less) diamond structure around individual atoms. In amorphous diamond, a majority of the atoms have $sp^3$-like bonds to four neighboring atoms, and minority of the atoms are bonded to three other atoms in a $sp^2$-like bonding geometry, similar to that, of graphite; FIG. 2B depicts graphite-like $sp^2$ bonds 214 between an atom 210 and three other atoms 212. The percentage of minority ($sp^2$-bonded) atoms may vary; as that percentage approaches aero over some area, a crystal grain becomes identifiable.

Thus, it is to be understood that the term "diamond material" as used herein includes single-crystal diamond, polycrystalline diamond (with ordered or disordered grains), nanocrystalline diamond, and amorphous diamond, and that any of these materials may include defects and/or dopants and/or impurities. Further, the distinctions between different forms of diamond material are somewhat arbitrary not always sharp; for example, polycrystalline diamond with average grain size less than about 100 nm can be labeled nanocrystalline, and nanocrystalline diamond with average grain size less than about 10 nm can be labeled amorphous.

Shell 102 may include multiple layers of diamond material, and different layers may have different composition. For example, some but not all layers might include a dopant; different polycrystalline oriented layers might have a different preferred orientation for their crystal grains or a different average grain size; some layers might be polycrystalline oriented diamond while others are polycrystalline disoriented, and so on. In addition, coatings or implantations of atoms that do not form diamond lattices may be included in shell 102.

Shell 102 may be fabricated as a unitary diamond structure, which may include crystalline, polycrystalline or amorphous diamond. Alternatively, shell 102 may be fabricated in sections, each of which is a unitary diamond structure, with the sections being joined together after fabrication. Examples of both types of fabrication processes are described below.

Shell 102 is advantageously made with very smooth interior and/or exterior surfaces. For example, surface smoothness may be defined based on the maximum or root-mean-square (RMS) deviation from a given locus defining a "perfect" surface shape or from a measured locus defining an average surface shape. Smoothness may be measured by sampling the entire surface or just within a certain region on the surface. In one embodiment, the maximum deviation is controlled, to within about 4 nm.

Shell 102 can also be made with very uniform thickness. Using techniques described below, the shell thickness may be controlled such that a maximum or RMS deviation of the distance between the inner and outer surfaces does not exceed a specific value; for example, the maximum deviation may be less than about 200 nm. Where shell 102 is spherical, uniform thickness implies concentricity of the internal and external shells; as a result, the spherical capsule will exhibit a highly symmetric mass distribution, which is helpful in providing a symmetric implosion of the fusion fuel.

In other embodiments, the shapes of the inner and outer surfaces of shell 102 can be controlled to provide a non-zero concentricity offset. Concentricity can be measured by sampling points on each of the inner and outer surfaces and using those points to determine an "inner center" and an "outer center"; to the extent that these two centers are different, the spheres are not concentric. Concentricity can be controlled by controlling the thickness of the shell during fabrication thereof; specific techniques are described in section II below and in above-referenced application Ser. No. 11/067,609. In some embodiments, shells may be made with a precisely controlled concentricity offset, which may be near zero or non-zero as desired.

Methods of measuring smoothness and concentricity are described in above-referenced application Ser. No. 11/067, 609. Suitable techniques described therein include scanning probe microscopy (SPM), atomic force microscopy (AFM), interferometric microscopy (IM) using electromagnetic or acoustic waves, and the like.

B. Fusion Fuel

For use in fusion applications, the interior of shell 102 is filled with a mixture (referred to herein as "fusion fuel") consisting essentially of some number of fusible atoms or ions. Atoms or ions of any element susceptible to nuclear fusion may be included in the fuel mixture, including but not limited to hydrogen isotopes such as ordinary light hydrogen ($^1H$), deuterium ($^2H$), tritium ($^3H$), and/or helium isotopes such as $^3He$ or $^4He$. Any combination of fusible atoms, including atoms of different elements and/or different isotopes of the same element, may be used. For example, in one embodiment, the fuel mixture consists primarily of deuterium and tritium in approximately equal concentration; such a fuel mixture is referred to herein as "D-T". In another embodiment, the fuel mixture includes deuterium, tritium and $^3He$ and is referred to herein as "D-T-$^3He$". In still another embodiment, the fuel mixture includes deuterium, and $^3He$ with little or no tritium and is referred to herein as "D-$^3He$".

In yet another embodiment the fusion fuel mixture is (or includes) a chemical formulation of helium-3 deuteride. In particular, $^3He^2H$ is expected to be a stable gas with a higher liquefaction and solidification temperatures than either of its constituents; the compound also provides the desired ratio of constituents for the fusion reaction of $^3He$ and deuterium.

Helium-3 deuterides, including $^3He^2H$, can be prepared by a reaction of pure or nearly pure $^3He$ with pure or nearly pure $^2H$ using a disassociative Ryberg process (e.g., using laser absorption by or electron beam interaction with helium orbital electrons) and cooled by laser or electron cooling to a stable temperature; such processes are known in the art for reacting non-isotopically purified Helium and Hydrogen to form helium hydrides.

Figure 3:
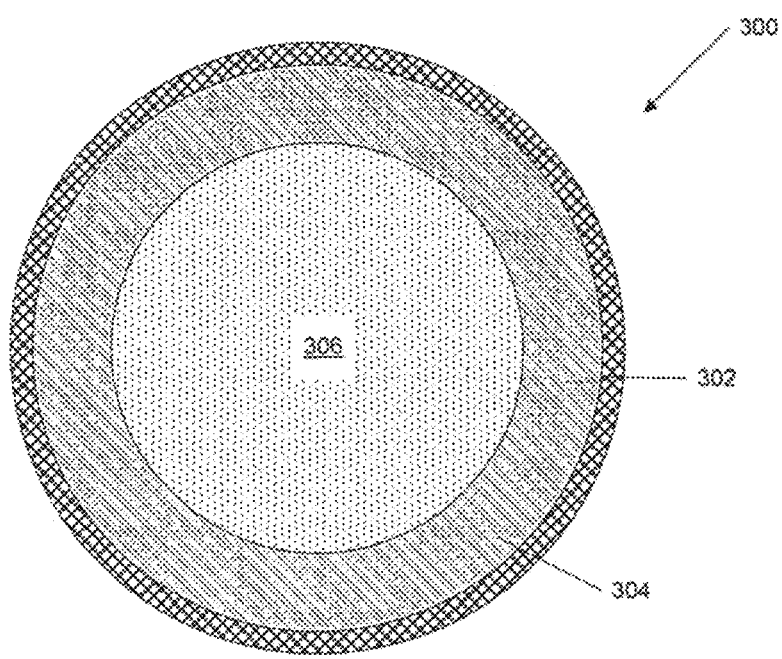
FIG. 3 is a cross-sectional view of a capsule having a shell that is lined with a layer of fusion fuel in a solid state according to an embodiment of the present invention.

The fuel can be held in solid, liquid, and/or gas states. For example, FIG. 3 is a cross-sectional view of a capsule 300 in which shell 302 is lined with a layer 304 of fusion fuel in a solid state. The interior 306 is filled with the same fuel in a fluid (e.g., liquid or gas) state. In one embodiment, a charge of D-T fuel in capsule 300 exerts a pressure of around 300 atmospheres at room temperature.

C. Access Port

Figure 4A:
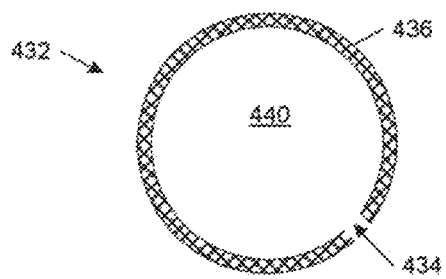
FIGS. 4A and 4B are cross-sectional views of a capsule with an access port in the shell according to an embodiment of the present invention.

In some embodiments, the capsule shell may form a complete barrier preventing access to the interior. In other embodiments, the shell includes one or more openings (referred to herein as "access ports") that permit access to the interior, e.g., for purposes of filling the capsule with the fusion fuel. FIG. 4A, for example, is a cross-sectional view of a capsule 432 with an access port 434 in the shell 436 that provides access to interior 440. The access port may be a simply be a hole whose size is measured as a percentage of missing surface area. Access ports can range in size from nearly 0% to about 50% of the surface area. The port can be normal to the surface or at an oblique angle, and may provide a straight path, bent path, or curved path connecting the exterior and interior of the shell.

Figure 4B:
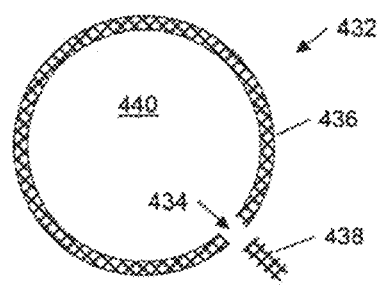

In some embodiments, a sealable member (e.g., a valve, plug or other structure) may be provided, allowing the port to be opened or closed. FIG. 4B schematically illustrates a plug or valve 438 that closes port 434 of capsule 432. Plug or valve 438 can be opened to allow material to be inserted into or removed from the interior, or it can be closed to keep material in or out of the interior. Plug or valve 438 can be formed as an integral part of the shell, e.g., as a deformable flap 406 of diamond material, or as a separate structure. Further examples of access ports and valve or plug structures for closing access ports, as well as techniques for fabricating such features, are described in Section II below.

C. External Coating

As is known, carbon-based diamond crystals, whether synthetic or naturally occurring, can be damaged by exposure to high temperatures in an oxidizing environment. To protect a carbon-based diamond capsule 100 (FIG. 1), a stabilizing coating, such as a silicon carbide film, may be applied to the outer surface of shell 102. The stabilizing material may be applied as a coating over the diamond shell or implanted between the crystal grains. Such stabilizing coatings are advantageously kept to a minimal thickness so as not to affect implosion of the capsule; in some embodiments, capsule 100 might not have any stabilizing coating. (Uncoated capsules can be protected by avoiding exposure to damaging environments.)

In some embodiments, a unique pattern can be made by small variations in the thickness of the stabilizing coating. These variations, which are detectable under ultraviolet (UV) and/or x-ray examination of the shell, can be used to provide a unique signature to each capsule. In addition, silicon carbide layers may be incorporated into shell 102 to facilitate and control fabrication of a relatively thick shell 102. A further discussion of silicon carbide coatings for stabilization and identification can be found in above-referenced U.S. Provisional Application No. 60/554,194. Unique identification can be used, e.g., to track individual capsules daring research aimed at optimizing capsule design and/or fuel mixtures, and can also be used during large-scale production for inventory tracking and quality control purposes.

A variety of materials may be used to coat and stabilize diamond shells. Examples include silicon, germanium, silicon carbide, silicon dioxide (including quartz), silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina). Suitable materials also include various other oxides, carbides, nitrides, fluorides or the like.

II. METHODS OF MAKING AND FILLING

As noted above, the shell of a capsule can be made in sections and then assembled, or the shell can be grown substantially complete as a single section. Examples of both types of processes will now be discussed. Additional description of methods of making and filling capsules may be found in above-referenced application Ser. No. 11/067,517, entitled "Diamond Capsules and Methods of Manufacture".

A. Forming and Attaching Sections of a Shell

Figure 5:
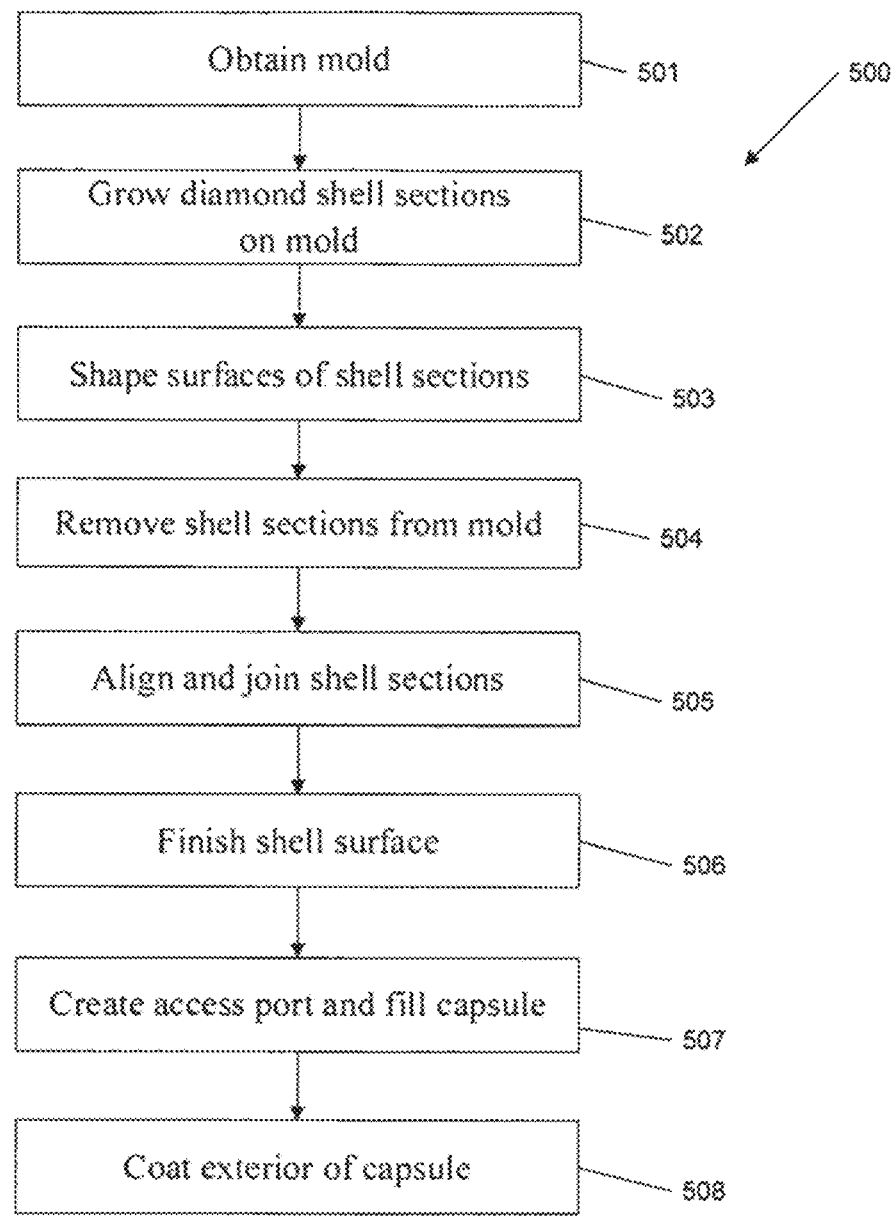
FIG. 5 is a flow diagram of a process for making a capsule from shell sections according to an embodiment of the present invention.

FIG. 5 is a flow diagram of a process 500 for forming a diamond, capsule according to an embodiment of the present invention, and FIGS. 6A-6K are illustrations of the capsule at various stages of process 500. In process 500, sections of a shell for a capsule are grown on suitably shaped substrates or molds, then attached or bonded together.

At step 501, a suitably shaped substrate (also referred to herein as a "form substrate" or "mold") is obtained. The mold has a surface shaped to the desired inner or outer surface configuration of a portion of the capsule such that diamond material grown on the mold takes the desired shape.

For instance, FIG. 6A is a cross-sectional view of a form substrate (mold) 600 that may be obtained at step 501. Mold 600 includes a 1-0-0 silicon wafer 602 having a top surface 603 on which hemispherical surface structures 604 are provided for forming substantially spherical capsules. Structures 604 may be formed integrally to wafer 602, e.g., using conventional silicon growth or etching processes. Alternatively, structures 604 may be formed separately from wafer 602, then bonded thereto. Structures 604 are advantageously shaped and finished to the desired shape and surface quality of the inner surface of the capsule shell. The shape and finish of structures 604 may take into account differences in thermal expansion characteristics and other properties between the substrate material and the diamond material to be grown thereon.

It is to be understood that while hemispherical structures are shown in FIG. 6A, structures with other shapes may be substituted to produce capsule sections in shapes other than hemispheres. In some embodiments, the surface structures of a mold may include recessed (concave) structures instead of or in addition to the convex structures depicted in FIG. 6A.

Where silicon molds are used, conventional techniques for preparing the substrates; shaping, smoothing, polishing or otherwise working the diamond material grown thereon; and removing the substrate material from the diamond material may be used. However, the present invention is not limited to silicon molds; any material on which diamond can be grown may be substituted. Examples of suitable materials include silicon, silicon carbide, silicon nitride, silicon dioxide (including quartz), titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, aluminum oxide (including alumina), or a suitable glass. In addition, the bulk of a mold structure such as structure 604 may be made of a first material that is easily shaped to high precision but not necessarily suited to growing diamond and coated with a layer of a different material more suited to growing diamond.

Referring again to FIG. 5, at step 502, one or more layers of crystalline, polycrystalline, or amorphous diamond material (i.e., any material having a diamond lattice structure at least on the scale of a few nanometers) is grown on at least a portion of the mold surface to form a shell section. The surface of the layer(s) generally follows the shape of the substrate surface. For example, FIG. 6B shows hemispherical diamond shell sections 606 formed on hemispherical structures 604 of mold 600.

Conventional techniques for growing a diamond layer on a flat surface may be employed in combination with the non-flat surface of mold 600 to grow a diamond layer on the mold surface. If appropriate, the surface of structures 604 may be seeded to facilitate growth of the diamond material thereon. Various growth processes may be used. For example, crystalline or polycrystalline diamond can be grown using chemical vapor deposition (CVD), plasma enhanced chemical vapor deposition (PECVD), hot wire diamond growth, or the like. Amorphous diamond can be grown using pulsed laser deposition (PLD) or other processes known in the art. Suitable process parameters for each of these techniques are known in the art and may be employed to form shell sections 606.

Where polycrystalline or nanocrystalline diamond is grown, the growth process may foster the formation of crystal grains with either a preferred or random orientation relative to a surface of the layer. Techniques known in the art for growing ordered or disordered polycrystalline or nanocrystalline diamond may be employed.

In some embodiments, multiple diamond layers are grown successively during step 502 (FIG. 5), and different layers may have different grain sizes (e.g., some layers might be polycrystalline while others are nanocrystalline or amorphous). The grains in different layers may have the same preferred crystal orientation, different preferred orientations, or random orientations as desired. In some embodiments, the surface structures of the mold define fittings at or near peripheral edges of some or all of the shell sections, and the fittings are grown as part of the shell sections. For instance, recesses may be formed on one section that match protrusions on another section; such fittings can be used in capsule assembly, as described below.

In some embodiments, dopants or other materials are introduced during the growth process to provide desired electrical, thermal or mechanical properties in the completed shell. The term "dopant", as used herein refers to atoms of a type other than the type of which the diamond lattice is predominantly composed that occupy lattice sites. Dopant atoms may provide more, fewer, or the same number of bonding sites as the majority atoms and may be introduced for a variety of purposes. For example, dopants may be added to make certain layers, certain regions, or all of the shell electrically conductive. Dopants or other materials may also be used to stabilize the shell from oxidation at high temperatures.

Some dopants may also affect the behavior of the shell in an ICF reactor environment. For example, adding dopants can change the absorption cross section for various forms of radiation (e.g., x-rays) that may be incident on the shell. Dopants may also be used to modify the thermal expansion coefficient, specific heat, or other thermal properties of the shell. Such dopants may be introduced uniformly throughout the shell. Alternatively, one or more dopants may be selectively introduced (e.g., introduced only in certain regions of the shell or introduced at different concentrations in different regions of the shell) to impart desired gradients in various thermal and/or electromagnetic properties. In an ICF reactor, such gradients can impart a specific shape to the explosion or ablation of the shell and thereby also shape the spatial distribution of the imploding fuel mixture.

For these and other purposes, a variety of dopants may be used, including but not limited to boron, nitrogen, astatine, polonium, americum, antimony, bismuth, arsenic, germanium, iodine, tellurium, selenium, silicon, and bromine.

Other materials can also be introduced, e.g., as discrete layers between, two layers of diamond material or covering the outermost layer of diamond material. Examples include stabilizing materials, such as silicon, germanium, silicon carbide, silicon dioxide (including quartz), silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina). Suitable materials also include various other oxides, carbides, nitrides, fluorides or the like. Still other suitable materials provide adhesive properties; examples include the above materials as well as gold, silver, copper, nickel, platinum, indium, palladium, lead and uranium.

Dopants or other materials can be introduced during growth of a diamond or other material layer, or during separate ion implantation, diffusion, or coating steps that may be performed at various stages during growth of the shell sections. Processes known in the art may be used to introduce dopants during diamond growth or to grow or deposit layers of other material between stages in diamond growth. Where a muitilayered shell section is grown, dopants or other materials may be included in some, all or none of the layers.

In some embodiments, dopants or other materials help to facilitate and control growth of the shell. For example, where relatively thick shells are being formed, introduction of dopants or other materials at various stages during diamond growth can help reduce strain on the diamond lattice, e.g., by creating layers with varying interatomic distances resulting from the dopant atoms or material layers. Introduction of such layers can help to maintain the proper atomic spacing (thus reducing strain) within the different layers of polycrystalline or nanocrystalline diamond material as the diameter of the shell increases. Layers of amorphous diamond can also be introduced to relieve strain.

In one such embodiment, for a spherical shell with an inner diameter of 1.95 mm, and an outer diameter of 2 mm (or more), diamond might be grown to a thickness of at least 50 micrometers (about 5% of the radius of the sphere). Thereafter, a silicon coating can be deposited over the diamond layer, followed by implantation of germanium into the silicon and further diamond growth. The surface of the shell may be reseeded prior to further diamond growth. It is to be understood that other dopants or combinations of dopants may also be used and that such dopants may be added continuously throughout the diamond growth process or only during selected stages of diamond growth as desired.

Referring again to FIG. 5, at step 503, following growth of the shell material, the shell surfaces may be further shaped to impart desired properties (e.g., smoothness or desired surface features) thereto. Prior to such shaping, the substrate may be cut apart (e.g., by dicing the wafer) and some or all of the excess material stripped away, allowing each section to be processed separately; FIG. 6C illustrates a shell section on a wafer portion 602' that may result from dicing wafer 602 of FIG. 6B. Alternatively, a group of shell sections may be processed together while still attached to a common substrate, and dicing is not required. In some embodiments, the shell sections 606 may be removed from the molds 600 prior to post-growth shaping, allowing both inner and outer surfaces of the shell sections to be shaped.

A variety of shaping operations may be performed. In some embodiments, the inner and/or outer surfaces may be chemically modified, polished, lapped, or ground to a desired smoothness, e.g., such that a maximum or RMS local deviation from smoothness on the surface is less than about 4 nm. Conventional micromachining or nanomachining processes may be used. Additional tools and processes for shaping diamond surfaces at nanoscale precision are described in above-referenced Application Ser. No. 11/067,609.

In other embodiments, portions of the surface of a shell section 606 may be machined or chemically modified to provide fittings for a mechanical connection between sections. For example, FIG. 6D shows a hemispherical shell section 608 with complementary fittings 610, 612, which may be grown during step 502 using suitably shaped molds, then machined during step 503 to precise tolerances. Two shell sections 608 can be interlocked using fittings 610, 612 as described below.

In still other embodiments, some or all of the diamond shell sections may be differentially heated to provide or enhance a desired chemical, structural, mechanical, acoustic, optical, electrical or magnetic property that depends on absolute temperature of the object and/or on a temperature differential between different portions of the object. In some embodiments, the difference in properties between shell sections may persist after the completed shell reaches thermal equilibrium; in other instances, a transient difference in properties (e.g., a size difference between shell sections due to thermal expansion of one of the sections) is induced and exploited to assemble shell sections as described below.

Figure 6E:
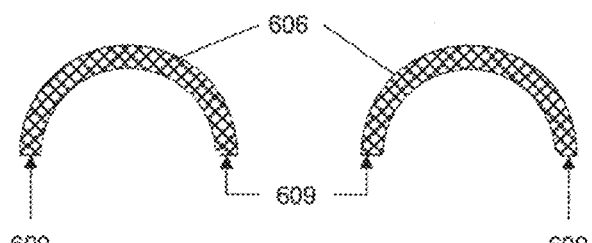

Referring again to FIG. 5, at step 504, the shell sections are removed from the mold. FIG. 6E is a cross-sectional view of hemispherical diamond shell sections 606 of FIG. 6B after removing mold 600, including hemispherical sections 604.

In some embodiments, removal of the mold involves destruction of at least part of the mold material. For instance, all or part of the mold material may be removed using conventional wet or dry etching processes that chemically dissolve the mold material but not the shell material. Where the substrate is made of silicon, a well-known dry etchant such as $CF_6$ might be used. Examples of wet etchants include liquid sodium hydroxide, which can be used at 300° C. in the Bayer process to dissolve alumina; lye; aqua regia; hydrofluoric acid; and the like.

In other embodiments, the removal process does not destroy the integrity of the mold, allowing the mold to be reused. For example, in FIG. 6C, if shell section 606 covers about 50% (or less) of a spherical surface, then the mold 602 can be popped out by slightly flexing shell section 606 and/or mold 602.

Figure 6F:
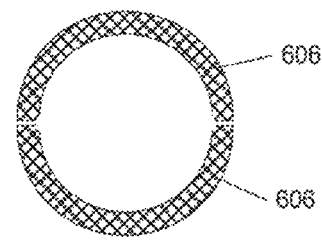

Referring again to FIG. 5, at step 505, the shell sections 606 (FIG. 6E) are aligned and joined at their peripheral edges 609 to form a capsule, as shown in FIG. 6F. Joining step 505 may be accomplished using various mechanical or chemical bonding techniques. In some embodiments, joining step 505 is performed in a fluid environment, and the resulting capsule is thereby filled with fluid. Examples of joining techniques will now be described; it is to be understood that other techniques could be substituted.

Figure 6G:
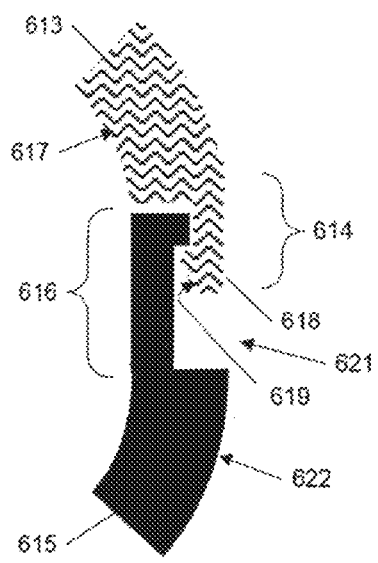

In some embodiments, the peripheral edges 609 of shell sections 606 are shaped such that they interlock when pushed together. For example, FIG. 6G shows a magnified view of a complementary latch 614 and socket 616 at the junction of two shell sections 613, 615. Latch 614 on a peripheral portion of the inner surface 617 of shell section 613 has a protrusion 618 with a sloping interior surface 619 followed by a recess 620 in the opposite direction from the slope. Socket 616 of shell section 615 has a recess 621 on the outer surface 622. The two sections 613, 615 interlock when pushed together in relative alignment, as shown in FIG. 6G.

Figure 6H:
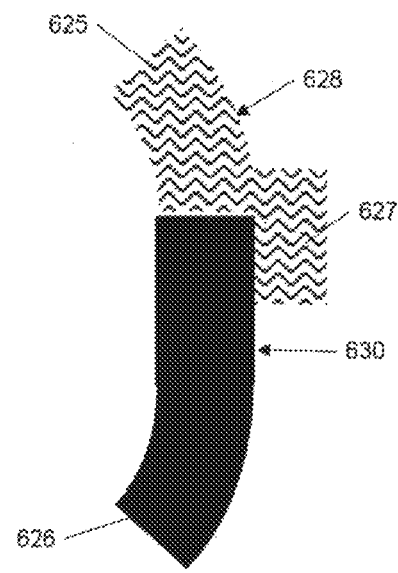

In other embodiments, the two shell sections are joined using a form fit or interference member that extends in a band around the widest point of the capsule to hold the sections together under pressure. For example, FIG. 6H shows a magnified view of shell sections 625, 626 that are held together by an interference ring 627. The interference ring 627 is made as a protrusion approximately parallel to the surface 628 of shell section 625 and may be an integral part of shell section 625. Interference ring 627 is shaped such that its inner surface aligns with the outer surface 630 of the other shell section 626. In some embodiments, in order to join the sections, a temperature differential is created such that section 626 is at a lower temperature than the section 625 while sections 625 and 626 are pushed together as shown. The resulting shell is then allowed to come to thermal equilibrium while sections 625 and 626 are held in place. As equilibrium is reached, section 625 contracts and/or section 626 expands so that the outer surface 630 pushes into the inner surface of interference ring 627, thus creating an interference contact.

For instance, shell section 626 may be cooled to 4 K while shell section 625 is kept at a higher temperature (around 20 K) such that the interference ring 627 is a close but sliding fit on the target shell section 626. The two sections 625, 626 are pushed together and allowed to reach equilibrium temperature at 4 K, thereby contracting ring 627 into interference contact with section 626 and completing the assembly. This assembly procedure can be executed in a fluid environment (e.g., a hydrogen atmosphere), and the resulting capsule will contain some amount of the fluid.

Figure 6I:
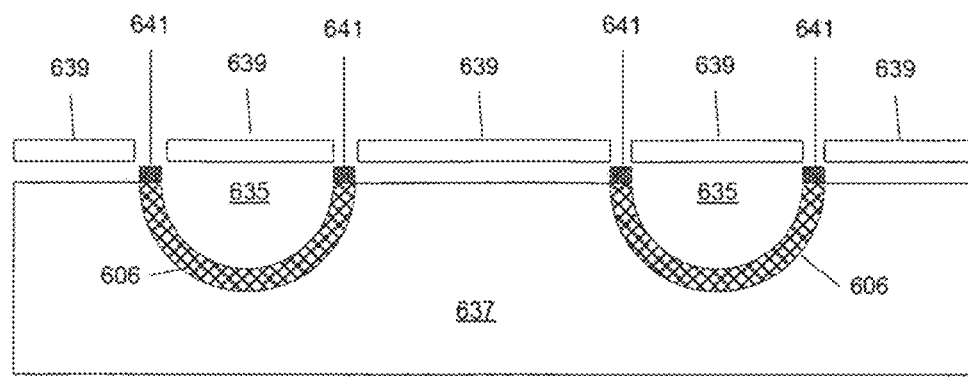

In other embodiments, the shell sections are joined using a bonding agent. For example, as shown in FIG. 6I, shell sections 606 can be placed in recesses 635 of a coating and alignment substrate 637 and aligned under a mask 639 so that edges 609 are exposed. Coatings 641 are then applied to edges 609, e.g., using sputtering or evaporation techniques well known in the art. The coatings 641 are advantageously chosen to have a melting point that is higher than the maximum operating temperature of the finished capsule but lower than the melting point of the diamond shell material.

Figure 6J:
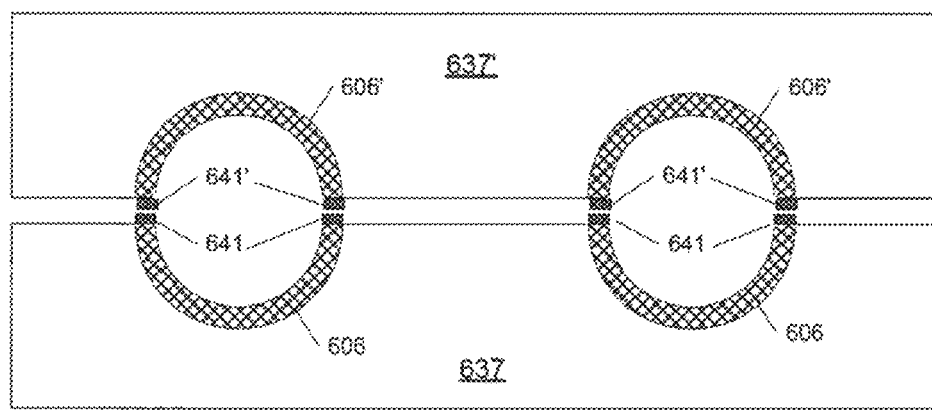

As shown in FIG. 6J, after coatings 641 are applied, edges 603 of section 606 are placed in contact with corresponding edges 609' of a complementary section 606', to which corresponding coatings 641' have been applied. Proper alignment of section 606 with section 605' may be achieved by forming complementary alignment structures in the respective substrates 637, 637', as is known in the art. The entire structure is baked (e.g., in a vacuum or inert gas oven) at a temperature and pressure sufficient to soften or reflow the coatings 641, 641', resulting in a bond between sections 609, 609'.

Coatings 641 may be applied to the entire surface of edges 609 or to selected contact regions on edges 609 as long as each contact region is sufficiently large (e.g., at least about 4 $\mu m^2$) to create a bond. These contact regions may have different orientations with respect to each other so that parts may be joined at complex bond angles; for instance, the edges to be joined can be rotated or tilted at any angle with respect to each other and are not required to be parallel to each other.

Figure 6K:
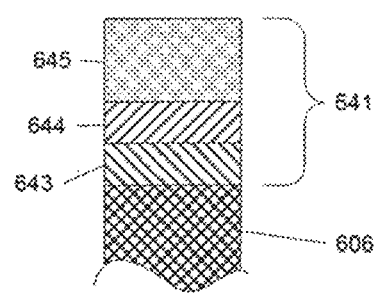

As shown in FIG. 6K, coatings 641 advantageously include multiple materials, such as an "adhesion" material 643 that adheres well to the edge of the diamond shell and a "bond" material 645 that can be softened or reflowed to connect the two sections. In some embodiments, an additional "coupling" material 644 that adheres well to both the adhesion material 643 and the bond material 645 can be deposited between adhesion material 643 and bond material 645; adhesion material 643 and bond material 645 need not adhere particularly well to each other, as long as each adheres well to coupling material 644. In other embodiments, the same material may provide both adhesion and bonding.

Coating 641 are advantageously made of materials that will provide a strong bond at the intended operating temperature of the resulting part. For example, for high-temperature applications (e.g., from about 200° C. up to about 800° C.), metal bonds may be used. In one embodiment, hemispherical shell sections 606 form a spherical capsule with a 2-mm diameter when assembled. A carbide-forming adhesion material 643 (e.g. titanium, silicon, chromium, or iron) is sputtered or evaporated onto edges 609 to a thickness of about 50 to 100 nm. A similar thickness of a coupling material 643 (e.g. nickel) is then applied, followed by a 200 nm to 2 micron thickness of a bond material (e.g. copper). The shell sections 606 are then placed in contact with each other and baked at a sufficient temperature (e.g., 900° C.) and pressure of about 50 g/mm$^2$ to bond the two copper coatings together. Those having ordinary skill in the art will recognize that other coating materials may also be used to provide higher or lower temperature performance.

For lower temperature applications (e.g., below about 200° C.), a similar process may be used, except that an additional material that adheres well to copper and has a lower melting point than copper may be applied after the copper bond material 645. Examples of suitable materials include silver, silver tin, tin, and/or lead, and other solder-like materials. The shell sections can be bonded at a lower temperature, e.g., 250° C.

For even lower temperature applications (e.g., below about 100° C.), edges 609 can be sputtered with silicon, over which a spin-on glass is applied. The shell sections can then be bonded at a temperature of, e.g., 150° C.

In another embodiment, coatings 641 include the adhesion, coupling and bonding materials 643-645 described above, along with a further coating of germanium or any alloy thereof including antimony and tellurium. In still other embodiments, coatings 641 may include alloys or layers of astatine, polonium, bismuth, and/or arsenic. These materials provide good bonding performance at low temperatures and also impart electromagnetic absorption characteristics that can be helpful in inducing symmetric expansion of the shell in an ICF reactor.

Figures 6L, 6M:
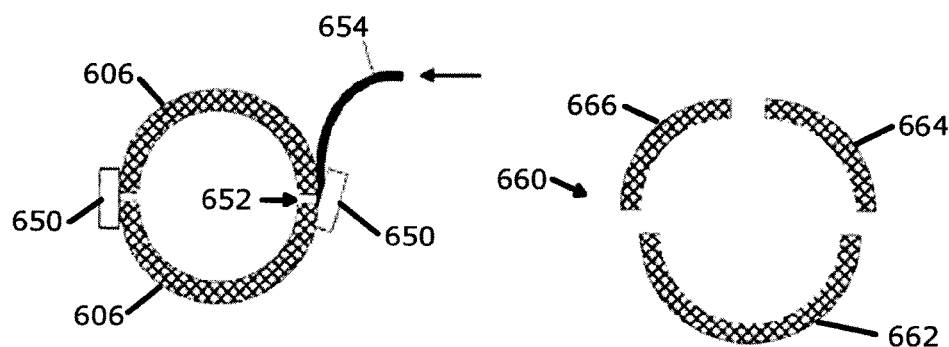

In some embodiments suitable for ultra-low temperature applications (e.g., about 4 K or below), various gases can be used as "cryoglues" to hold the shell sections together. For example, as shown in FIG. 6L, a band 650 is placed around shell sections 606, enclosing the joint line 652. Shell sections 606 are held at an ultra-low temperature (e.g., around 4 K), while a gas is directed inside band 650 using a heated pipe 654. The gas cools and hardens against the diamond joint area 652, providing an adhesive bond.

Gases suitable for use as cryoglues are mechanically inert and provide sufficient strength to hold the sections of the capsule in relative alignment. Examples include neon, argon, krypton, xenon and radon. In particular, neon/s extremely low thermal conductivity, nearly five orders of magnitude less then carbon-based diamond, and relatively low melting a preferred (24.48 K) make it a preferred choice as a cryoglue for many applications.

It will be appreciated that the bonding agents and techniques described herein are illustrative and that variations and modifications are possible. Any material or combination of materials that provides adequate adhesion between peripheral surfaces of adjacent shell sections at the desired operating temperature may be used.

Referring again to FIG. 5, at step 506, after the shell sections have been joined to form a capsule, an additional layer of diamond may be grown on the outer surface of the capsule. Any of the methods described above may be used, and techniques described below in Section II.B. for uniformly coating a three-dimensional object may also be employed. In some embodiments, the additional growth tends to fill any gaps between the shell sections, providing a smoother surface finish.

In some embodiments, the shell sections are joined in an atmosphere containing the fusion fuel in a fluid (e.g., liquid or gas) state, and the completed shell encloses some quantity of the mixture, with the precise quantity depending on the volume enclosed by the shell and the pressure of the atmosphere. The shell sections may also be joined in a low temperature environment in which the fusion fuel is frozen into a solid, in which case a solid ball or other shape of "fusion fuel ice" can be enclosed in the shell.

In other embodiments, an access port may be formed through the capsule (step 507), allowing access to the interior after the capsule is assembled. Access ports can be used for filling the capsule and also for providing access to the capsule for purposes of working the inner surface of the capsule and/or for working with other material, (e.g., fusion fuel ice) that may be enclosed in the capsule.

Access ports may be made in various ways. For example, an energetic beam of electrons, ions or photons may be used to remove the diamond material from some portion of the shell, thereby creating an opening to the interior. Femtolasers, which provide very short pulses of energetic photons, can be used to create small, well controlled openings. In other embodiments, nanomachining techniques guided by atomic force microscopy (AFM) or scanning force microscopy (SFM) may be used. Suitable techniques are described in above-referenced application Ser. No. 11/067,609.

Figures 7A, 7B, 7C:
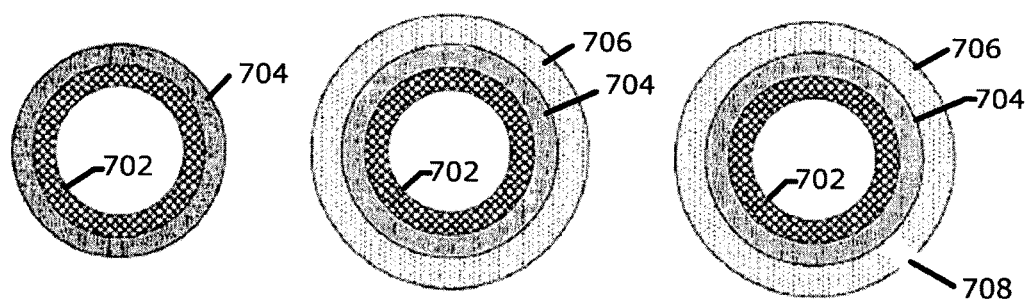
FIGS. 7A-7F are cross-sectional views illustrating a technique for forming a hole in a capsule according to an embodiment of the present invention.
Figures 7D, 7E, 7F:
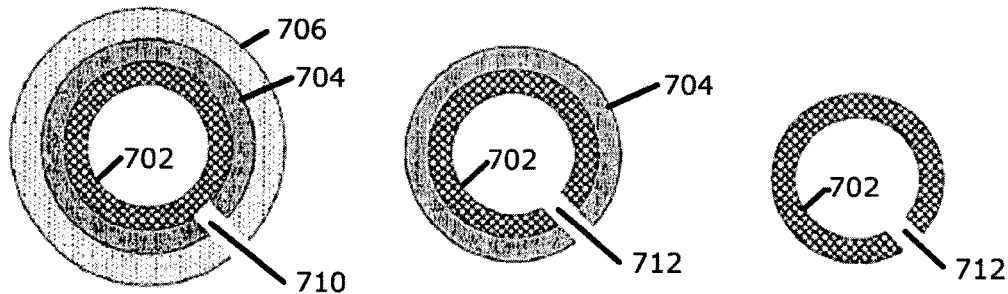

In other embodiments, an access port may be etched through the diamond material. For example, FIGS. 7A-7F are cross-sectional views showing a capsule at various stages of etching a port through the shell. In FIG. 7A, a diamond shell 702 is coated with an etch resist 704 such as aluminum. (It is to be understood that coating thicknesses are not shown to any particular scale in the drawings.) In FIG. 7B, a layer of photoresist 706 covers etch resist 704. In FIG. 7C, photoresist 706 is patterned (e.g., by focused pattern or focused spot, or laser spot or electron beam) so that photoresist 706 covers etch resist 704 except over a region 708 where the access port is to be located. In FIG. 7D, the exposed etch resist 704 has been etched to expose the diamond surface. In FIG. 7E, shell 702 has been etched through opening 710 to create an access port 712. Diamond shell 702 may be etched using, e.g., an oxygen plasma or phosphoric acid. In some embodiments, photoresist 706 is also removed by the etchant used to remove the diamond, leaving exposed etch resist 704, which protects diamond shell 702 everywhere except in region 712. In FIG. 7F, the rest of etch resist 704 has been etched away, producing a diamond shell 702 with an access port 712.

In still other embodiments, an access port can be formed by not enclosing some portion of the joint area where two sections are joined during step 505.

In some embodiments, the access port may be sealed after access to the interior is no longer necessary. For example, where the port is used to fill the capsule with a fluid, additional diamond material can be grown to cover or fill in the port after the capsule has been filled. Masking techniques or other techniques may be used to preferentially grow diamond inside or over the port. In other embodiments, a valve or plug may be provided for sealing the port. Examples of valves and plugs are described below, particularly in Section II.C.

Referring again to FIG. 5, at step 508, the exterior of the capsule is advantageously coated with a protective material, such as silicon carbide. Such a coating may be of the type described in Section I.D. above and may be applied using techniques described in above-referenced Application No. 60/554,194 or other suitable techniques.

In some embodiments, the coating provides resistance to oxygen penetration along with specific optical and identification functions. By suitably varying the materials and thickness of successive layers, one can construct a coating with specific optical properties, allowing different capsules to be uniquely identified, e.g., by a combination of scattered light and/or by coherent light signatures. In addition, the mass of the capsule can be used for at least partial identification.

In a specific embodiment, the coating material, e.g. silicon carbide may be doped to be conductive or left in its intrinsic form as an insulator. The silicon carbide layer may be directly coated onto the diamond, or in the case of carbon diamond, a layer of silicon may be deposited to act as an adhesion layer between the carbon diamond and the silicon carbide. In another embodiment, a carbon diamond structure may be implanted with a seed layer of silicon, forming silicon carbide sites. A silicon carbide coating can then be applied by CVD growth of the silicon carbide. The technique is well known in the art and is described, e.g., in the above-referenced article [STOL]). Alternatively, a silicon carbide plasma arc can be allowed to condense on the seeded surface. In yet another embodiment, a vacuum arc of a the desired coating material is applied to a diamond surface that has been made conductive by dopants or by exposure to ultraviolet or x-ray radiation; a vacuum arc can be used to coat diamond surfaces at a wide range of temperatures from near 0 K up to about 1000° C.

A variety of materials may be used to coat and stabilize diamond shells. Examples include silicon, germanium, silicon carbide, silicon dioxide, silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide. Suitable materials also include various other oxides, carbides, nitrides, fluorides or the like.

It will be appreciated that process 500 is illustrative and that variations and modifications are possible. Steps described as sequential may be executed in parallel, order of steps may be varied, steps may be modified or combined, or some steps may be omitted. For example, in some embodiments, the shell sections may be removed from the form substrate before any post-growth processing or between post-growth processing steps. An access port might or might not be made, depending on whether access to the interior is desired in a particular embodiment.

Surface modifications may be applied to the shells at various stages in manufacture, e.g., using nanomachining techniques as described in above-referenced application Ser. No. 11/067,609. For example, the outer or inner surface of shell sections 606 can be machined while sections 606 are still attached to mold 600 or after removal therefrom. In other embodiments, the outer surface of a finished capsule may be modified. In still other embodiments the inner surface of a finished capsule may be modified via a set of suitably positioned access ports. Fusion fuel ice enclosed in the capsule may also be modified via access ports, and fusion fuel ice may also be modified prior to insertion in the capsule using nanomachining techniques at sufficiently low temperatures, e.g., to shape a surface of a ball of fusion fuel ice to high smoothness or sphericity.

In addition, while hemispherical sections are described herein, it is to be understood that any number of substrate sections may be used. For instance, FIG. 6M is a cross-sectional exploded view of a capsule 660 formed from three sections 662, 684, 666. Further, the process is not limited to spherical capsules; capsules of any shape may be created by using suitably shaped form substrates or molds, as described in above-referenced application Ser. No. 11/067,517.

B. Growing a Unitary Shell

Figure 8:
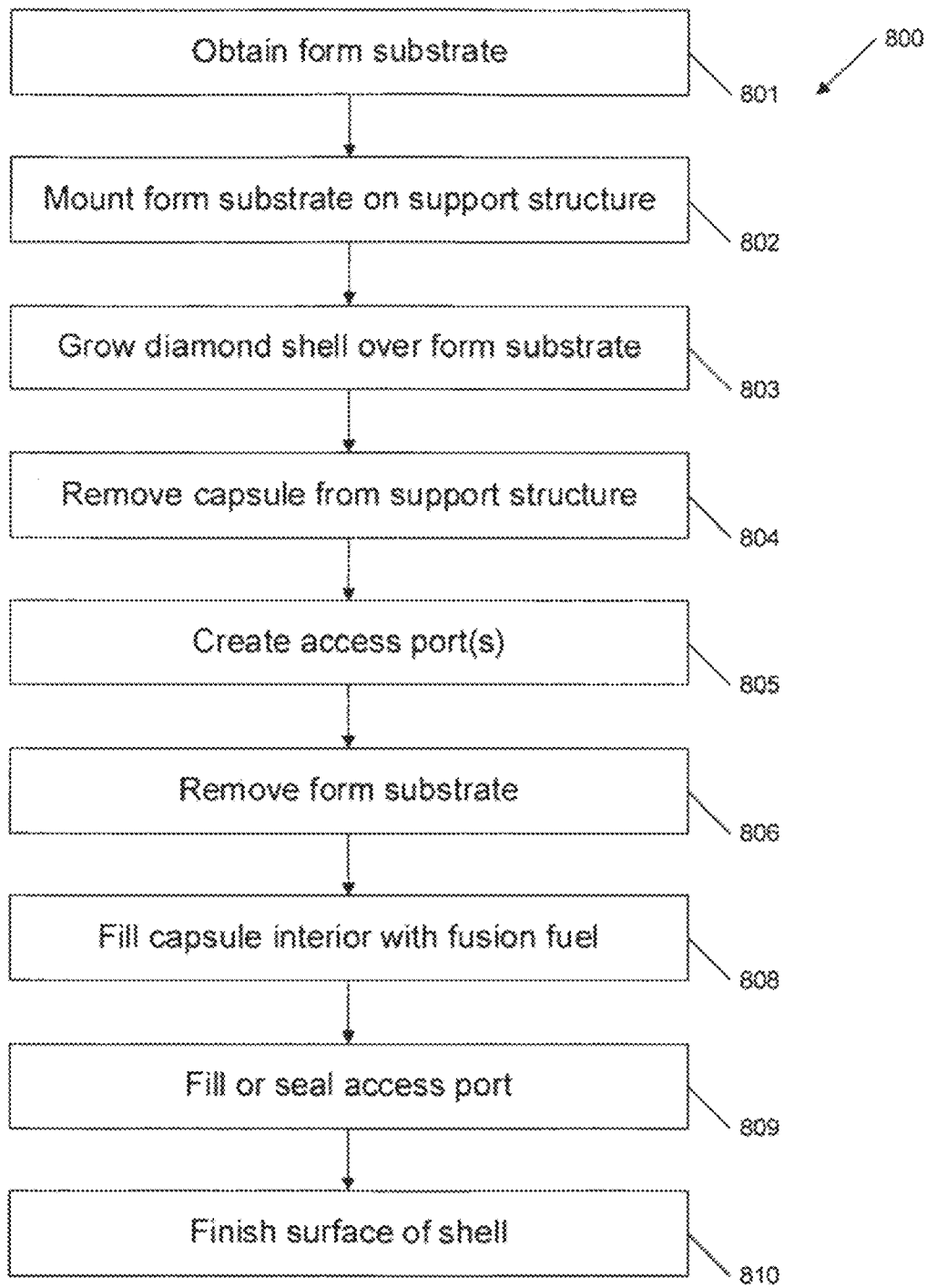
FIG. 8 is a flow diagram of a process for making a capsule according to another embodiment of the present invention.

FIG. 8 is a flow diagram of a process 800 for forming a diamond capsule according to an alternative embodiment of the present invention, and FIGS. 9A-9H are illustrations of the capsule at various stages of process 800. In process 800, a capsule shell is grown around a form substrate such that the shell covers more than half of the surface area of the form substrate.

At step 801, a suitably shaped form substrate is obtained. The form substrate advantageously has the intended shape of the inner surface of the shell, e.g., spherical, elliptical, cylindrical, or polyhedral. The form substrate may be made of any material on which diamond can be grown, and the substrate may have a smooth or featured surface as desired. Any of the materials described in Section II.A above as being suitable for molds may be used to make a form substrate, and a form substrate made of one material may be coated with a different material.

Figure 9A:
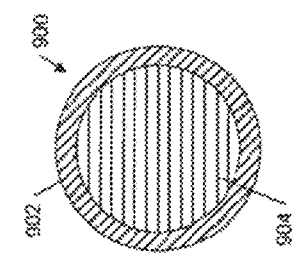
FIGS. 9A-9H are cross-sectional views of a capsule structure at various stages of the process of FIG. 8.

In one embodiment, a spherical form substrate 900 as shown in FIG. 9A is made from an alumina or silicon dioxide (quartz) or glass core 902 that is finished to some degree of smoothness, and a coating 904 applied to the outer surface to provide enhanced smoothness. Coating 904, which may be at least twice as thick as the maximum surface variation of the core 902, is advantageously made of a very hard material (such as SiC or $Si_3N_4$) that can be finished to a finer, smoother surface, sphericity, shape conformity, or shape variability than alumina or silicon dioxide. For example, in one embodiment, the RMS or maximum local deviation from smoothness on an outer surface of form substrate 900 is less than about 4 nm. If the form substrate core 902 is made from a material which can provide the desired degree of smoothness, then an additional coating 904 is not required.

Figure 9B:
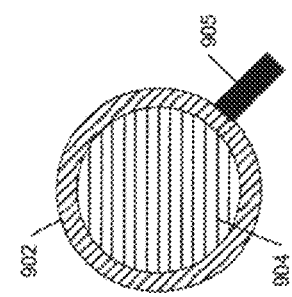

Referring again to FIG. 8, at step 802, the form substrate 900 is suspended by or positioned on a support structure in preparation for diamond growth. For example, FIG. 9B illustrates a support pin 905 holding form substrate 900. It is to be understood that multiple support pins 905 may be provided. Support pin 905 is advantageously made of a material with poor adhesion to diamond or a material that can be etched away after diamond has been grown on form substrate 900.

Other support structures may also be used, including structures with multiple contact points. The support structures may include relatively narrow pins (or rods) that provide a small contact area with form substrate 900, pedestal structures that provide a larger contact area, or the like. In some embodiments, the support structure may include a suspension structure that contacts form substrate 900 from above. Further examples of support structures are described in Section II.C below.

Figure 9C:
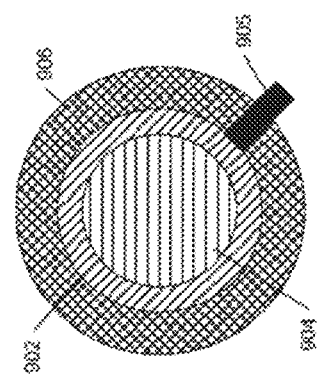

At step 803, a diamond shell is grown over the form substrate; FIG. 9C shows a diamond shell 906 grown over coating 904 of form substrate 900. Selected areas on the surface of form substrate 900 may be patterned and seeded prior to diamond growth, and any of the techniques described in Section II.A above for growing diamond on a shaped substrate may be used for growing the diamond shell at step 803. In some embodiments, step 803 may include growing multiple layers, introducing dopant atoms or other materials, and/or forming coating layers, as described above. Depending on the composition of support structure 905, diamond might or might not coat the surface of structure 905 where it extends beyond the outer wall of shell 906.

In preferred embodiments, diamond shell 906 is made to be relatively uniform. For example, seeded form substrate 900 may be placed on a continuously moving element in the diamond growth chamber, such as a spinning disk with a track along which form substrate 900 can roll, so that all portions of the surface of substrate 900 are approximately uniformly exposed to the plasma or vapor. In another embodiment, form substrate 900 may be moved (e.g., rotated) intermittently during diamond growth to allow diamond shell 906 to grow uniformly over the surface of substrate 900. Pin 905 (or other support structures) may remain in contact with the same point on form substrate 900, or it may move to different points as form substrate 900 is rotated. Where a track is used, the track may provide the support structure, and pin 905 or similar structures may be omitted.

Figure 9D:
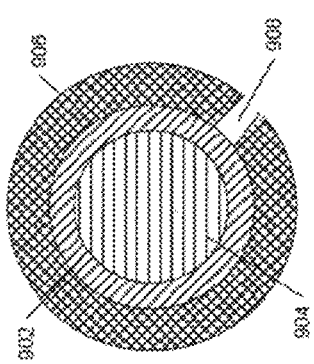

At step 804, after diamond shell 906 is formed, the assembly is removed from pin 905 or other support structures for further processing, including removal of form substrate 900. Removal of the diamond shell may result, in one or more holes through diamond shell 906 where pin 905 was in contact with the surface of form substrate 900. For example, FIG. 9D illustrates a hole 908 left by pin 905. In some embodiments, hole 908 is usable as an access port. At this stage, any excess diamond material that may have formed around pin 905 may also be removed (e.g., by cutting, grinding, or the like).

At step 805, one or more additional access ports may be created through diamond shell 906, e.g., if pin 905 or another support structure did not create a suitable hole 908, or if more access ports or larger ports are desired. Techniques described above with reference to step 507 of process 500 (FIG. 5) may be used to create these additional access ports or to enlarge hole 908 into a suitable access port.

Figure 9E:
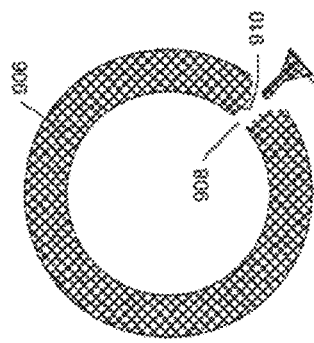
Figure 9F:
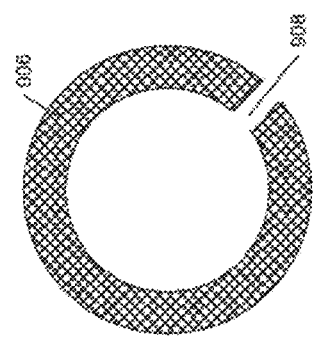
Figure 9G:
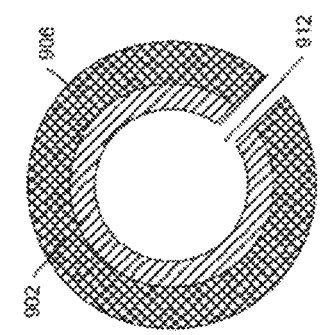

Referring again to FIG. 8, at step 806, the form substrate material is removed through the access ports. The form substrate may be removed by wet or dry etching Using suitable etchants to dissolve the form substrate material, leaving the diamond shell intact. One suitable etching process is illustrated in FIGS. 9E-9G. A first etchant selectively removes coating material 904 until surface 910 of form core 902 is reached, as shown in FIG. 9E. For instance, if coating material 904 is SiC or $Si_3N_4$, $CF_4$ and/or other etchants known in the art may be used.

Thereafter, a second etchant selectively removes core material 902 through opening 912, as shown in FIG. 9F. For example, if core 902 is made of alumina, liquid sodium hydroxide may be used in the well-known Bayer process to selectively remove core 902. If core 902 is made of silicon dioxide, hydrofluoric acid may be used to etch away the material. The remainder of coating 904 may then be removed using the first etchant (or a different etchant), to obtain the hollow shell 906 shown in FIG. 9G.

It is to be understood that the invention is not limited to specific form substrate materials or etchants, and different techniques for removing core material through an access port may be substituted. In general, the speed with which material can be removed depends at least in part on the number, size, and relative placement of the access ports used for removal, with more and/or larger ports generally correlating with faster removal.

Referring again to FIG. 8, after removal of the form substrate material, at step 808 the interior of the capsule can be filled with a fluid via access port 908 of FIG. 9G, and at step 809 access port 908 is filled or sealed. A wide variety of fluids may be inserted at step 808, and specific examples are described below; in other embodiments, the interior of the capsule is left hollow. In some embodiments, access port 908 is sealed through further diamond growth, e.g., through a mask as described above with reference to step 514 of process 500 (FIG. 5). Diamond may be grown so as to cover or fill in port 908. In other embodiments, various plug or valve structures may be provided for closing access port 908. Specific examples of valve or plug structures and techniques for fabricating them are described below.

For example, in one embodiment, shell 906 with access port 908 (shown in FIG. 9G) is placed into a chamber that is filled with a fusion fuel such as D-T, D-T-He or D-He as described above. In some embodiments, methane may be mixed with the fusion fuel. The pressure in the chamber is held above 500 atmospheres for a time ($t_e$) long enough to allow the internal and external pressures to reach equilibrium. Thereafter, the pressure in the chamber is rapidly reduced to around 1 atmosphere), and further diamond growth over a time ($t_g$) that is much shorter than te closes the access port, trapping the high-pressure fusion fuel inside.

Diamond growth at step 809 may be continued until the ports are sized appropriately to the needs of the application. In some instances, the ports may be completely filled or only partially filled.

In some embodiments, electrical charge may be used to promote or deter diamond growth in or near the access port. For example, all or part of the diamond shell can be made conductive by doping with boron, nitrogen or other suitable dopant. During a diamond growth process, the conductive portions of the shell can then be charged so as to repel the plasma; if the area inside or around the access port is not charged (or is not doped), diamond growth will preferentially occur in or around the access port so that the port can be closed or constricted as desired. It should be noted that for other applications, the conductive portions of the shell could also be charged so as to attract the plasma, so that diamond growth would preferentially occur on the conductive portions of the shell.

In other embodiments, all or a portion of the surface 910 that defines access port 908 (see FIG. 9G) is made conductive by doping one or more layers of diamond shell 906, at least around the desired portions of surface 910. The layers may be doped as shell 906 is grown (e.g., while support structure 905 is present). Any conductive portion along the length of surface 910 may be made to encourage or inhibit diamond growth by inducing an appropriate charge to attract or repel the plasma. In yet another embodiment, diamond growth can be promoted in the portion of surface 910 nearest inner wall 912 by lowering the growth temperature and adjusting the platen temperature of the layer, shell, or coating being grown. In this manner, the size of the access port for each layer, coating, or shell may be controlled, and the size of the port may be varied as a function of depth within the shell.

Figure 9H:
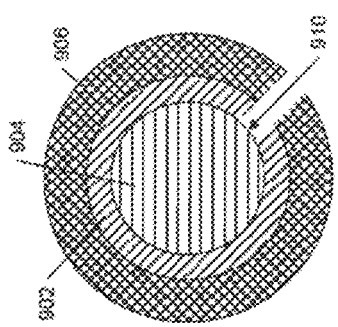

In other embodiments, access port 908 can be narrowed to a specified diameter (e.g., about 5 microns or less) for some distance along surface 910, as shown in FIG. 9H. The port may then be closed using a diamond plug 914. Diamond plug 914 may be as long as or shorter than the full depth of port 908. Plug 914 can be formed by growing diamond in a suitably shaped mold or by machining diamond parts to the desired shape. Port 908 can be prepared to accept plug 915, e.g., by reaming port 908 to remove excess material and/or by polishing the surface 910 to a desired finish.

Referring again to FIG. 8, at step 810, post-growth processing is performed. Such processing may include machining or shaping the capsule, coating the capsule, or other steps to provide a finished capsule with the desired properties; these steps may be similar to the post-growth processing steps described in Section II.A above. It should be noted that in some embodiments, coating with silicon carbide, alumina or other oxygen transport inhibitors is advantageously performed before the capsule is filled with fusion fuel.

It will be appreciated that the process described herein is illustrative and that variations and modifications are possible. Steps described as sequential may be executed in parallel, order of steps may be varied, steps may be modified or combined, or some steps may be omitted. For example, any of the modified and alternative processes described below may be used in place of any or all of the steps shown in process 800.

C. Additional Processes

1. Multiple Support Pins

Figure 10A:
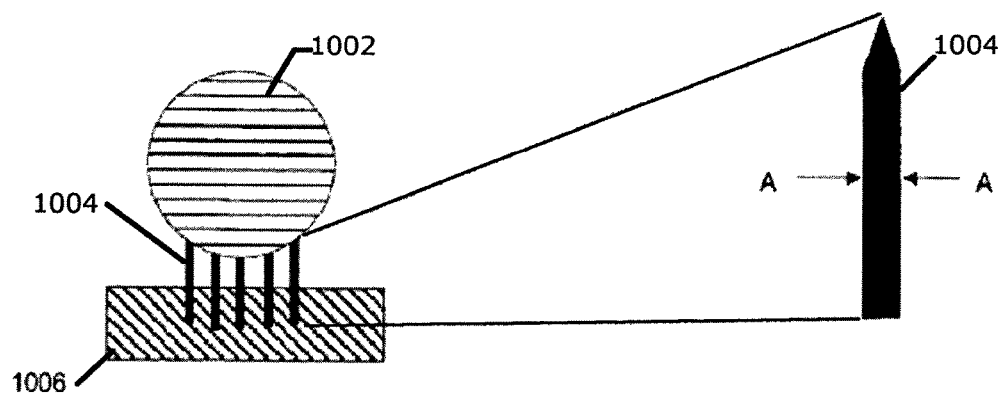
FIGS. 10A-10F illustrate a diamond capsule and support apparatus at various stages in the fabrication of a capsule according to an embodiment of the present invention.

In one modification to process 800, a form substrate may be set upon multiple support pins mounted in a base. FIGS. 10A-10E illustrate a capsule at various stages of such a manufacturing process. FIG. 10A shows a form substrate 1002 set upon multiple pins 1004 that are mounted on a base 1006. The ends of pins 1004 that contact substrate 1002 may be pointed (as shown in the enlargement at the right of FIG. 10A), flat, or concave (or convex) so as to conform to the shape of the form substrate, and the cross section of the pins along line A-A may be generally circular, rectangular, or any other desired shape.

Pins 1004 may support substrate 1002 from the bottom (as shown) or from the side, or substrate 1002 may be suspended from pins 1004 that contact substrate 1002 from above. In addition, pins 1004 may be oriented normally, obliquely, or tangentially to the surface of substrate 1002 at the point, of contact.

Figures 10B, 10C:
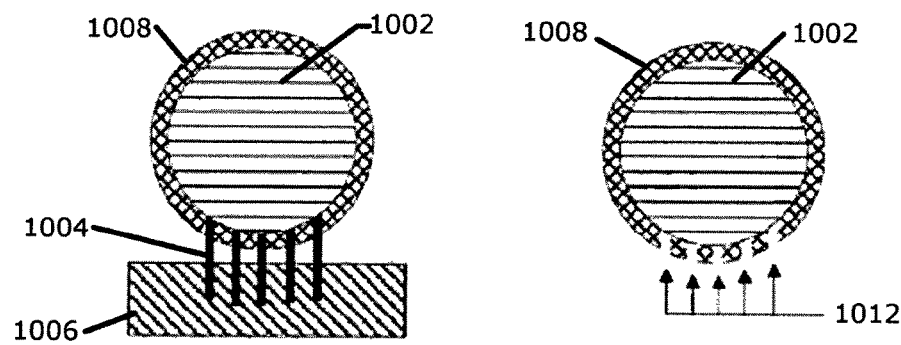
Figures 10D, 10E, 10F:
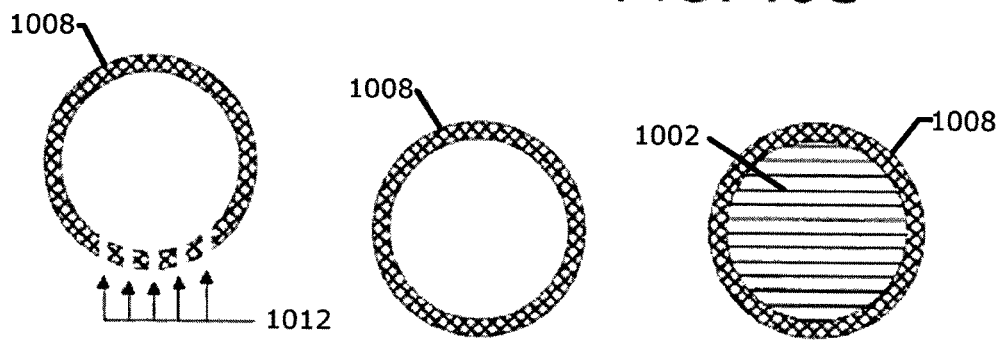

FIG. 10B shows a diamond shell 1008 grown over the form substrate 1002 while substrate 1002 remains in contact with pins 1004. FIG. 10C shows shell 1008 after its removal from pins 1004; a number of access ports 1012 through shell 1008 have been created. FIG. 10D shows shell 1008 after: the removal of form substrate 1002 through access ports 1012. After removing form substrate 1002, ports 1012 may be closed, as shown in FIG. 10E, to create a hollow capsule. In an alternative embodiment, ports 1012 may be closed without removing form substrate 1002, so that the interior of the resulting capsule is filled with a solid material as shown in FIG. 10F.

2. Processing Multiple Form Substrates in Parallel

Figure 11:
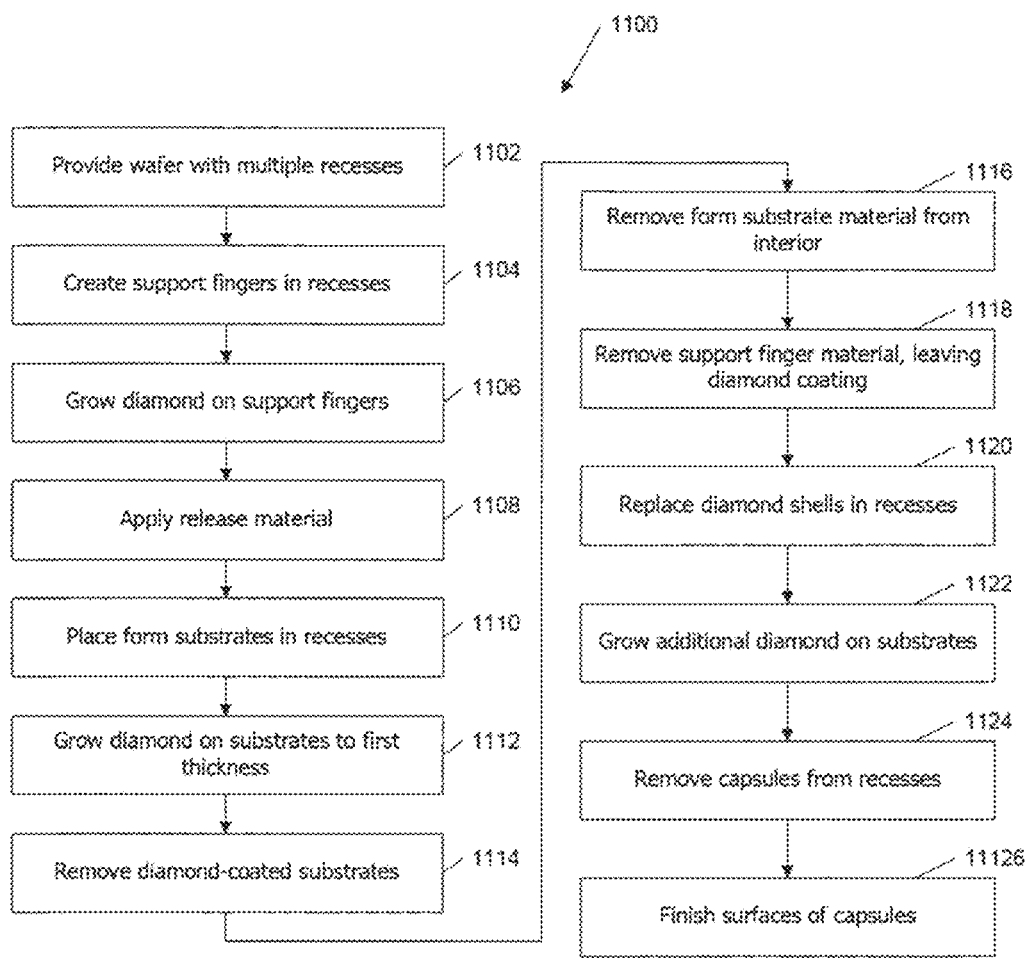
FIG. 11 is a flow diagram of a process for forming multiple diamond capsules in parallel according to an embodiment of the present invention.

In another modification, a large number of form substrates may be processed in parallel. FIG. 11 is a flow diagram of a suitable process 1100, which is a variation of process 800 described above, and FIGS. 12A-12I illustrate various stages and features of this process.

At step 1101, a number of recesses (or holes) are formed in a substrate wafer of a suitable material. For instance, FIG. 12A shows a wafer 1204 with a number of recesses 1208 formed therein. Wafer 1204 may be made of silicon, silicon carbide, sapphire or other suitable material in which recesses 1208 can be formed. Recesses or holes 1208 may be created by any process including but not limited to lithography and etching, conventional machine tools, electric discharge machining (EDM), or water jets, and each recess 1208 is advantageously made to be larger than the dimensions of a capsule to be formed therein.

At step 1102, fingers 1202 for supporting a form substrate 1206 are formed in the recesses 1208, as shown in inset 1210 of FIG. 12A, which also shows a form substrate 1206 in place in recess 1202. Fingers 1202 are advantageously made of a substrate material such as silicon nitride, silicon carbide, silicon oxide, sapphire or the like. In one embodiment, the length of fingers 1202 is at least 1.5 times the intended thickness of the capsule transverse cross section of fingers 1202 may be rectangular with dimensions on the order of 200 µm by 0.1 µm, or approximately circular with an area of under 20 µm².

As shown in side view in FIG. 12B and end view in FIG. 12C, each finger 1202 may be made of one or more tubes 1210 on or embedded in a support structure 1212. Tubes 1210 may be hollow or solid tubes formed of silicon nitride. In some embodiments, tube 1210 is a multilayer structure, e.g., with a hollow or solid silicon nitride core surrounded by polysilicon and further surrounded by a coating of silicon nitride. In one embodiment, each tube 1210 has a rectangular cross section of about 3.5 µm by about 5 µm and is at least as long as the intended thickness of the capsule shell. Support structure 1212, which is fixed to the side of recess 1208, may be made of silicon, silicon carbide, silicon oxide, sapphire or other suitable substrate material. Tube 1210 is placed on support 1212 such that end 1211 will be in contact with form substrate 1206.

At step 1103, diamond 1214 is grown over fingers 1202, as shown in side view in FIG. 12D. At step 1104, a release material is applied to wafer 1204, including fingers 1202. Any material with low adhesion to diamond may be used as a release material; examples include tantalum nitride, silicon carbide, or the like.

Figure 12E:
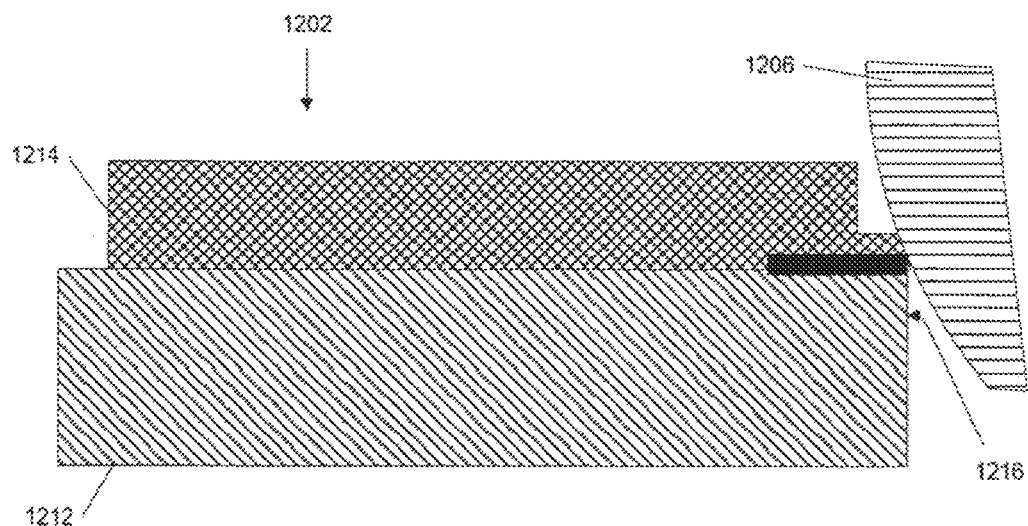

At step 1105, a spherical form substrate (or mold) 1206 is inserted into each recess 1208. Form substrates 1206 may be generally similar to the spherical form substrates described above, and may be inserted in various ways. For example, a number of forms 1206 may be rolled or shaken over wafer 1204, allowing a form 1206 to drop into each recess 1208. As shown in FIG. 12E, forms 1206 drop into recesses 1208 and contact the diamond coating 1214 of fingers 1202 at a surface 1216.

Figure 12F:
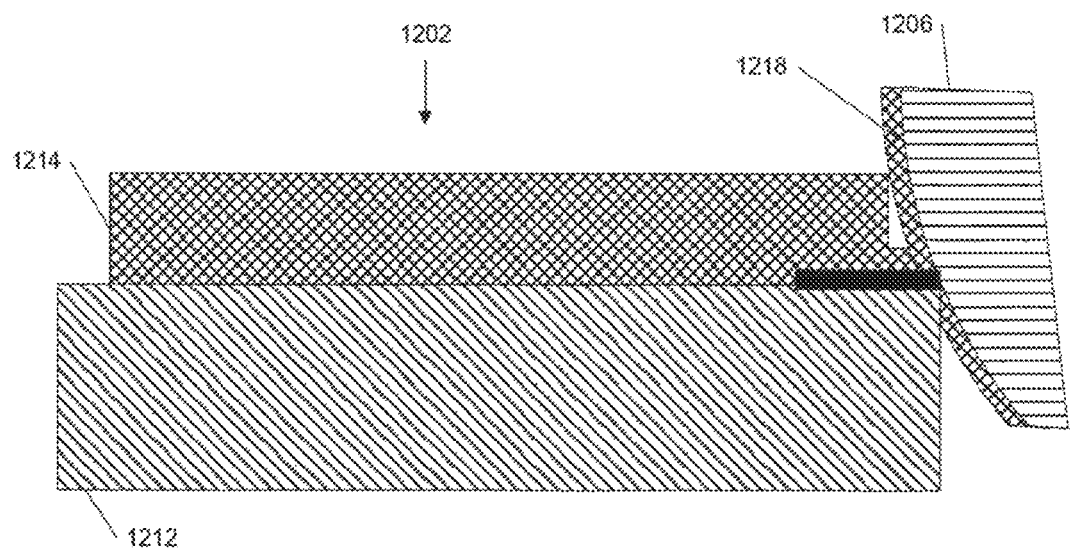

At step 1106, a diamond layer is grown on forms 1206 to a thickness less than the total desired thickness of the capsule shell but large enough to provide a shell, with sufficient structural integrity and rigidity to be self-supporting. FIG. 12F shows a form 1206 with diamond 1218 grown thereon so as to form a shell. (For convenience, only a portion of shell 1218 is shown.)

At step 1108, forms 1206 with diamond shells 1218 are removed from recesses 1208; the presence of a release material between diamond finger 1214 and shell 1218 allows for easy separation of the two. During removal, the position and orientation of each shell 1218 is advantageously maintained or otherwise registered so that each shell 1218 can be returned to the same recess 1208 in the same orientation. Upon removal from recess 1208, shell 1218 has openings therein corresponding to the contact area of fingers 1202. At step 1110, form substrate 1206 is removed through these openings, e.g., using etching processes as described above, leaving hollow diamond shells 1218.

Figure 12G:
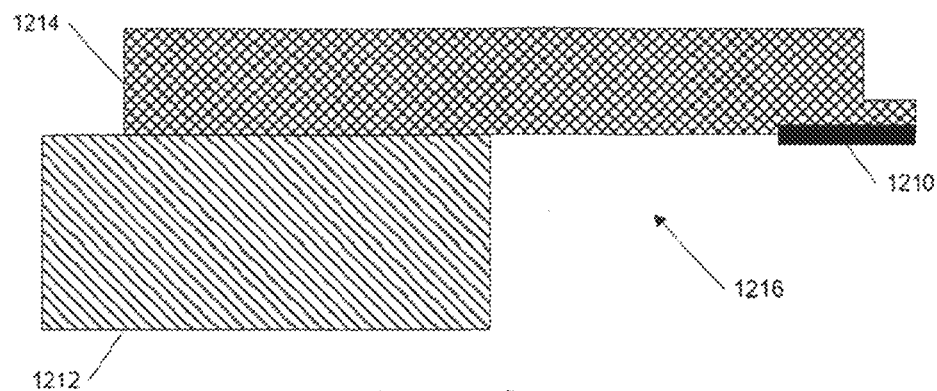

At step 1112, the support material 1212 in region 1216 of finger, 1202 is removed, as shown in FIG. 12G, leaving the under side of tube 1210 exposed. Conventional etching processes, may be used to remove this material. After removal of the support material 1212, tube 1210 and diamond coating 1212 remain in region 1216, which is at least as long as the intended final thickness of the diamond shell.

Figure 12H:
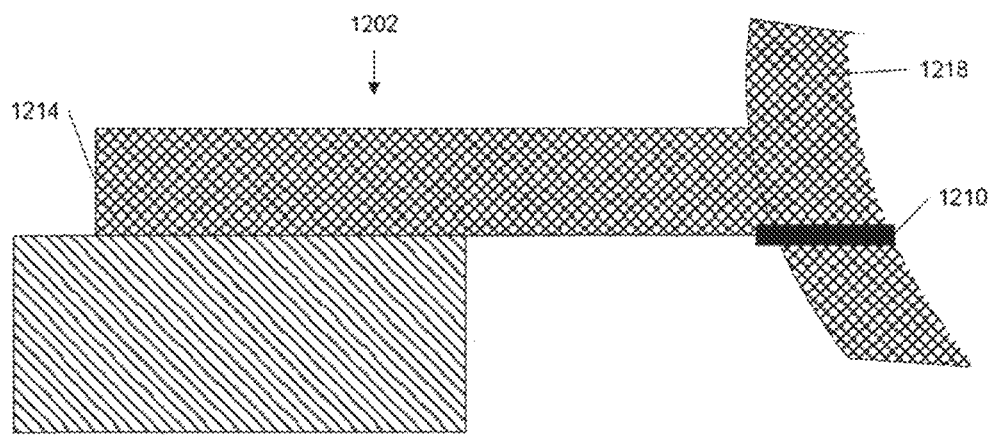

Thereafter, at step 1114, diamond shells 1218 are replaced in recesses 1208. Preferably, each shell 1218 is replaced in the same recess from which it was removed, with the same orientation relative to fingers 1202 as it previously had. At step 1116, diamond growth over shells 1218 is continued, until shells 1218 reach the desired thickness as shown in FIG. 12H.

At step 1118, shells 1218 are removed from recesses 1208; this step may involve cutting through diamond 1214, e.g., using a laser or mechanical cutting device. At step 1120, final processing (e.g., polishing and coating as described above) is performed. It should be noted that a portion of diamond coating 1214 from the finger 1202 advantageously becomes part of diamond shell 1218.

Figure 12I:
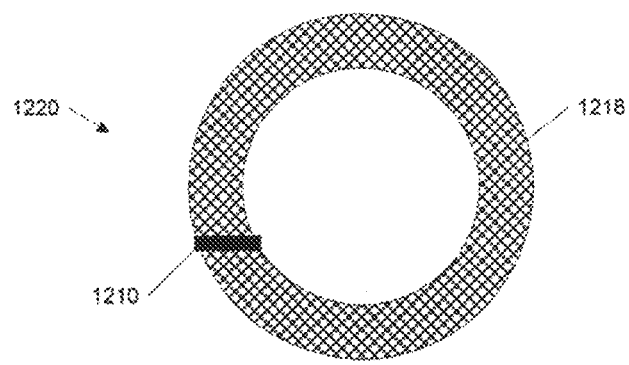

FIG. 12I shows the resulting diamond capsule 1220, in which tube member 1210 provides an access port. In some embodiments, tube member 1210 may have a hollow core; if the core is not hollow, tube member 1210 or its core may be removed, e.g., using a suitable etching process. Capsule 1220 can be filled via the access port provided by tube member 1210, which can then be closed, e.g., by filling it with additional diamond or a plug as described above.

3. Forming an Integrated Valve Structure

In other embodiments a valve can be formed integrally with the shell. The valve provides a scalable opening into the interior of the capsule through movement or deformation. In one embodiment, the valve is formed from a flap of diamond that can deform slightly under a pressure differential to seal the capsule.

A shell with an integral valve flap can be made using a process similar to process 1100 described above with a slight modification in placement, of the support fingers relative to the form substrate. FIG. 13A shows a representative finger 1302 that includes a tube member 1310 resting on a support member 1312. Finger 1302 is coated with diamond 1314. Fingers 1302 may be similar in structure and composition to fingers 1202 of FIGS. 12B-12D and may be arranged in recesses 1208 in a wafer 1204 as shown in FIG. 12A. Fingers 1302, however, are arranged to contact the surface of form substrate 1306 at a shallower angle (i.e., more nearly tangential to the surface) than that shown in FIG. 12C. Process 1100 can be used with fingers 1302 to form a shell for a capsule.

The resulting capsule 1320 is shown in FIG. 13B. Shell 1322 has an access port 1324 formed from tube member 1310 of FIG. 13A. Access port 1324 penetrates through shell 1322 at an angle α with respect to a surface normal 1326, as shown by the dotted lines. A relatively thin flap 1326 of diamond material is thereby formed. When the pressures inside and outside shell 1322 are nearly equal, flap 1326 is in its neutral position, and access port 1324 is open, allowing material to enter the shell. If the pressure inside shell 1322 exceeds the pressure outside, flap 1326 deforms outward toward member 1328, closing access pert 1324. Thus, capsule 1320 can be filled with a fluid by placing capsule 1320 in a high-pressure fluid environment and allowing capsule 1320 to reach equilibrium, then quickly reducing the external pressure so that flap 1326 deforms outward, sealing the high-pressure fluid inside.

The sealing behavior of flap 1326 can be further enhanced by suitably shaping the end 1330 of tube member 1310 (FIG. 13A) that contacts form substrate 1306. For instance, FIG. 13C illustrates a tube member 1310 with flanges 1332 formed near end 1330.

In another variation, the end of a pin used to support the form substrate is shaped such that a flap will be formed as the diamond shell is grown. FIGS. 14A and 14B illustrates examples of shaped pins 1402, 1404; sections of respective diamond shells 1406, 1408 with flaps 1410, 1412 formed around pins 1402, 1404 are shown. After the shell (1406 or 1408) is grown, pin 1402 or 1404 can be extracted or etched away to open an access port. It should be noted that shaped pins such as pins 1402, 1404 may be used to define access ports regardless of whether the shell is formed as a unit (e.g., as in process 800 of FIG. 8 described above) or in sections (e.g., as in process 500 of FIG. 5 described above).

Figure 15E:
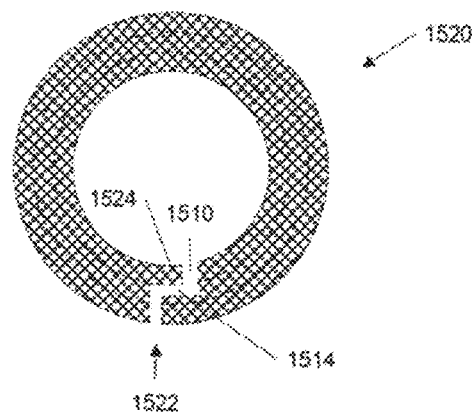

In still another embodiment, an integrated valve structure can be formed by introducing different support members at different stages in diamond growth, e.g., in a further variation of process 800 described above. FIGS. 15A-15F illustrate one suitable procedure. FIG. 15A shows a form substrate 1502, which might be, e.g., 2 mm in diameter, supported by a first support member 1504 (e.g., a pin as described above), allowing formation of a uniformly thick diamond layer 1506, which may be, e.g., 10 nm to 100 μm thick. In FIG. 15B, first support member 1504 has been removed and replaced by a second support member 1508. Second support member 1508 is advantageously large enough to cover the opening 1510 in layer 1506 that was created by removing first support member 1504 and to extend beyond opening 1510 in at least one direction. With second support member 1508 in place, a diamond layer 1512 is grown over layer 1506. The combined thickness of layers 1506 and 1512 might be, e.g., 50 μm to 100 μm.

Figure 15F:
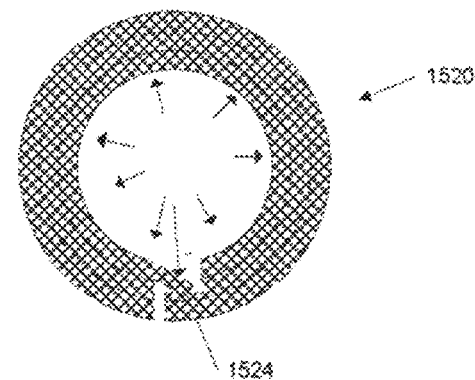

Thereafter, as shown in FIG. 15C, support member 1508 is removed, creating an opening 1514 contiguous with opening 1510. Form substrate 1502 is advantageously removed through openings 1510 and 1514, e.g., as described above in process 800. Next, as shown in FIG. 15D, a third support member 1516 is introduced, and a final diamond layer 1518 is grown. FIG. 15E shows the finished capsule 1520 after removal of support member 1516; opening 1522 created by support member 1516 is contiguous with opening 1514, creating an access port to the interior of capsule 1520. The access port includes a deformable flap 1524. As shown in FIG. 15F, when capsule 1520 is filled with a fluid at higher pressure than the external environment (pressure is indicated by the arrows), flap 1524 deforms outward, sealing capsule 1520.

In some embodiments, the access port may be used to fill capsule 1520 with a fluid at temperatures as low as a few degrees K, after which capsule 1520 and its contents are brought up to a higher temperature (e.g., room temperature, around 20° C.) while opening 1522 is covered. At temperatures at which the fluid inside capsule 1520 is a gas, the high pressure (e.g., up to 500 atmospheres) pushes on diamond flap 1524 to seal capsule 1520, as depicted in FIG. 15F, and opening 1522 can be uncovered.

To provide a high-quality seal, the walls of the access port may be polished as they are formed or before the capsule is filled. Where the diamond surface of the port walls can be brought to a surface smoothness (RMS deviation) of less than 10 nm, a diamond-to-diamond seal Is adequate for many applications.

In other embodiments, e.g., where the walls of the access port are not smooth surfaces, the sides of the access port may be coated with a compliant sealing material to improve the quality of the seal. Examples of compliant sealing materials Include germanium, silicon, silicon nitride, silicon carbide, aluminum, antimony, bismuth, polonium, astatine, americum, platinum or gold; the coating may be 10 nm to 50 μm thick, depending on the grain size of the diamond material.

In still other embodiments, an access port with an integral valve flap may be made using focused ion beam (FIB) and/or AFM-guided nanomachining after the capsule is formed.

4. Discrete Valve Structures

In another embodiment, the valve or plug that closes the access port is a discrete structure, which may be made of diamond or other suitable material, rather than an integral part of the capsule shell.

Figure 16A:
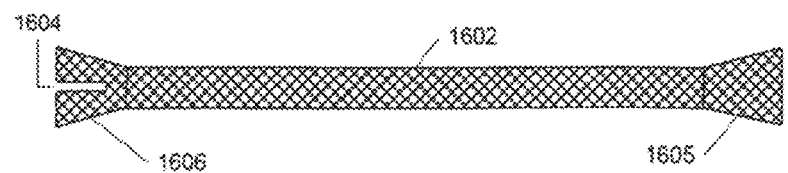
FIGS. 16A-16F are cross-sectional views of a valve member for a diamond capsule according to an embodiment of the present invention.
Figure 16B:
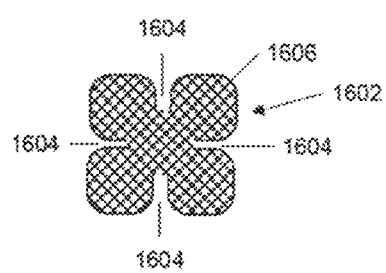

For example, FIGS. 16A and 16B are, respectively, a side view and an end view of a filament valve 1602 made of a diamond material. Filament 1602 is advantageously at least as long as the intended thickness of the capsule shell and has a tapered section 1605, 1606 at each end. Its cross section may be rectangular as shown in FIGS. 16A and 16B, round, or other shapes as desired. Slots 1604 are cut or formed in one tapered section 1606 of filament 1602.

Figure 16D:
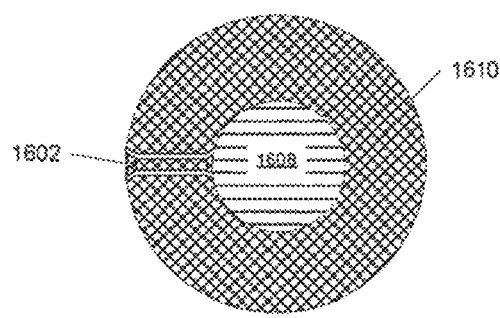
Figure 16C:
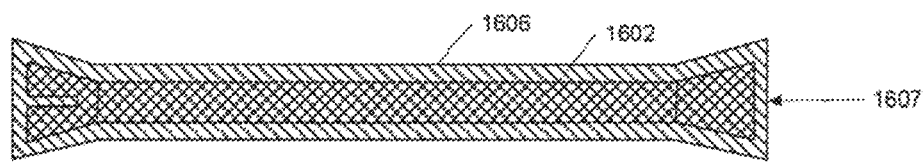

In one embodiment, shown in FIG. 16C, filament 1602 is coated with silicon nitride or other removable material 1606. As shown in cross section in FIG. 16D, the non-slotted end face 1607 of coated filament 1602 is held in contact with the surface of a form substrate 1608 while a diamond shell 1610 is formed. Shell 1610 is advantageously formed with one or more openings (other than at filament 1602) through which form substrate 1608 can be removed. After shell 1610 is formed, coating 1606 is removed (e.g., by etching), exposing filament 1602.

Figure 16E:
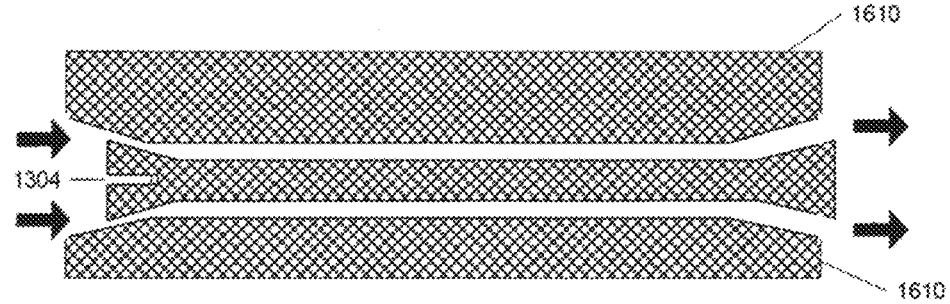

Once coating 1606 is removed, filament 1602 is operable as a valve. FIG. 16E is a cross-sectional view of shell 1610 and filament 1602 in a filling arrangement. Filament 1602 is displaced inward by pressure (arrows) of a filling fluid outside the capsule. Slots 1604 in tapered section 1606 allow for deformation sufficient that the filling fluid can pass into the capsule through spaces 1612 surrounding filament 1602. In one embodiment, the capsule is filled at a low temperature as described above.

Figure 16F:
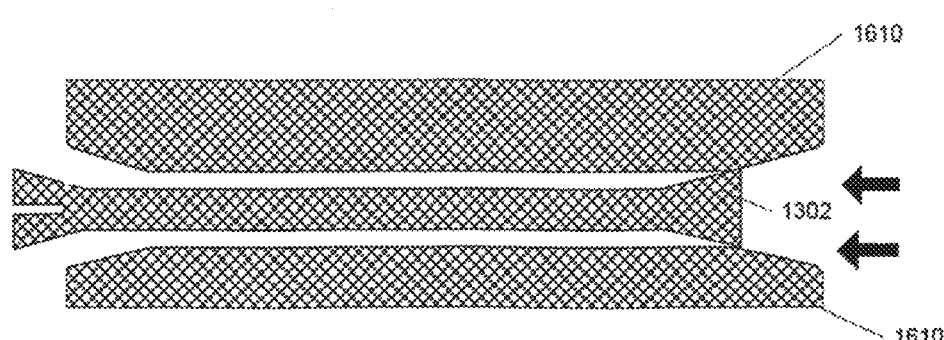

After the capsule is filled, a pressure differential between the interior and exterior of the capsule is created, e.g., by raising the temperature of the capsule, such that the fluid inside is at higher pressure than the pressure outside the capsule. As shown in FIG. 16F, the resulting outward pressure (arrows) displaces filament 1602 outward, sealing the capsule.

It is to be understood that FIGS. 16A-16F are illustrative. Valve structures may be made of diamond or any other suitable materials and may have any desired shape. Valves may open or close by displacement (e.g., as shown in FIGS. 16E and 16F), by expansion and contraction, by deformation, or by other movements.

5. Alternative Support Structures

In embodiments described above, pins, fingers or similar support structures were shown as having a relatively small area in contact with the form substrate. In other embodiments, the support structure may have a larger contact area, which can create a larger opening and provide for faster removal of the form substrate material.

For example, FIGS. 17A and 17B are, respectively, a perspective view and a side elevation view of a pedestal 1700 on which a form substrate may be placed. Pedestal 1700, which has a trapezoidal cross section, is formed or mounted on a substrate base 1702 and, as best seen in FIG. 17B, top surface 1704 of pedestal 1700 has a concave shape with a curvature approximately matching the curvature of the form substrate (not shown in FIG. 17B) that pedestal 1700 is intended to support.

In one embodiment, pedestal 1700 can be formed in a silicon substrate 1702 using conventional MEMS techniques, followed by machining of surface 1704 to match the radius of curvature of the form substrate, then coated, e.g., with a silicon carbide or silicon nitride coating.

A form substrate (not shown in FIG. 17A or 17B) is seeded and placed on pedestal 1700, e.g., using a mounting material such as carbon dag (a suspension of fine carbon particles in ethyl alcohol, methyl alcohol, or other alcohol). A diamond growth process, e.g., any of the processes described above, is used to create a diamond shell with an opening corresponding to the shape of surface 1704 of pedestal 1700. For instance, FIGS. 17C and 17D are, respectively, a side cross-sectional view and a bottom view of a shell 1706 that has been formed on a form substrate 1708 held on pedestal 1700 (not explicitly shown in FIGS. 17C and 17D). An opening 1710 corresponding to the shape of top surface 1704 of pedestal 1700 has been created. Opening 1710 is relatively large, allowing for rapid removal of form substrate 1710. At this stage, shell 1706 advantageously has a thickness less than the desired, final thickness but sufficient to provide structural integrity and rigidity.

After substrate 1710 has been removed through opening 1710, it will generally be desirable to close or constrict opening 1710 to provide a more complete shell for the capsule. In one embodiment, a cap member for the capsule is created with form substrate 1708 in place. After removing the cap member and extracting form substrate 1708 the cap member is replaced and fused to the rest of shell 1706 by further diamond growth.

Figure 17E:
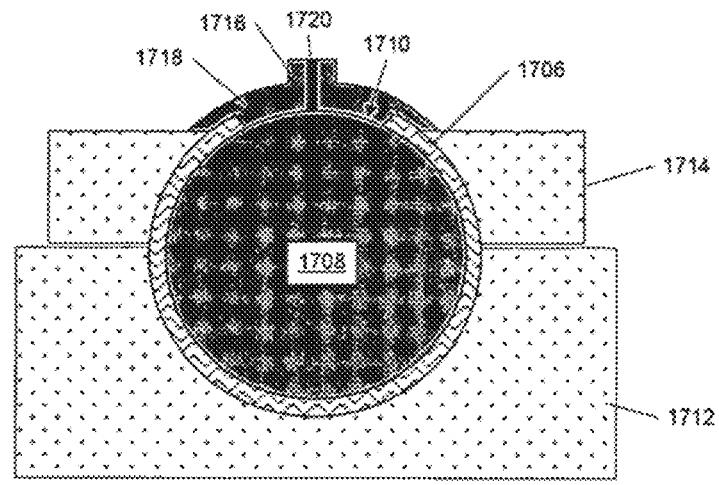

Formation of a cap member is illustrated in cross-sectional view in FIG. 17E. Form substrate 1708 with shell 1706 formed thereon is placed in a holder 1712, with opening 1710 now oriented upward. A mask plate (or cap plate) 1714 covers most of shell 1706, leaving opening 1710 and a relatively small surrounding area exposed. To create an access port for later use in filling the capsule, a diamond stub 1716 with an internal tube member 1720, which may be similar to diamond-coated tube 1210 described above, is placed atop form substrate 1708 and held in place by a suitable support structure (not shown). The support structure may include, e.g., a suspension structure or a support member connected to mask plate 1714. The exposed area, including mask plate 1714 and opening 1710, is coated with a release material, then seeded with diamond, and further diamond growth forms a cap member 1718. Cap member 1718 may be thicker than shell 1706 but is advantageously still not as thick as the final capsule thickness.

Figure 17F:
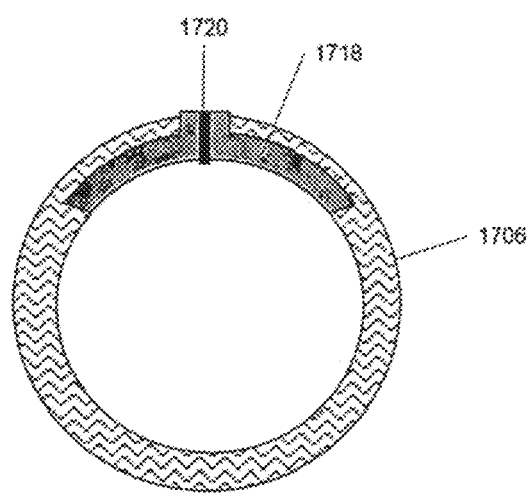

After cap member 1718 is formed, it is removed to expose opening 1710. In one embodiment, cap member 1718 can simply be pulled free due to the coating of release material between cap 1718 and the surfaces of shell 1706, form substrate 1708, and mask plate 1714. Shell 1706 is removed from holder 1712, form substrate 1708 is removed through opening 1710 and any remaining release material on shell 1706 or cap member 1718 is stripped away. Cap member 1718 is then replaced in opening 1710, and further diamond growth over shell 1706 and cap member 1718 can be performed until a desired final thickness is obtained, as shown in FIG. 17F. The capsule can be filled via an access port defined by tube member 1720 as described above.

It will be appreciated that the size and shape of the pedestal is illustrative and that other shapes may be substituted. The pedestal is advantageously shaped such that the cap member that is formed in and removed from the pedestal location can be replaced in the opening in only one orientation (as is the case for a trapezoidal shape, although other asymmetric shapes also provide this property). For example, in one embodiment, the pedestal might cover up to 50% of the surface area of the form substrate and may have an arbitrary shape. In one embodiment, the shell can be formed in two sections shaped like the flaps of a baseball, which are then attached to each other. In other embodiments, all or part of the pedestal might be replaced by a coating of a material such as tantalum nitride that inhibits diamond growth on coated portions of the form substrate.

In addition, rather than using pedestals or other masking materials to prevent shell growth over some section of the form substrate, an opening such as opening 1710 could be formed in shell 1706 after it is grown to an intermediate thickness. For example, laser cutting of the diamond material, of shell 1706 could be used opening 1710, or opening 1710 could be created by using an $O_2$ plasma or other suitable etchant to etch away the diamond material through a suitably patterned mask applied to shell 1706.

Due in part to the larger openings, such configurations permit fast removal of the substrate, e.g., by etching, since more substrate material is exposed to the etchant at a given time. Further, in some instances, depending on the size and shape of the covered portion of the substrate, the substrate can be removed by slightly deforming (flexing) the shell and/or the substrate, allowing the substrate to "pop" free. Flexural removal can be practiced where the form substrate material is silicon carbide or another material with poor adhesion to diamond and where the fraction of the substrate surface area covered by the shell material is small (e.g., about 50% or less) or where the shell material is arranged so as not to require the substrate to pass through a constricted opening, as in the case of the hemispherical shell sections described in Section II.A above or in the case of a "baseball flap" shell.

6. Filling Capsules with Solid Materials

In some embodiments, it is desirable to fill a capsule with solid fusion fuel. Where the capsule is formed in sections, solid fusion fuel can be enclosed in the capsule when the sections are joined, assuming that the joining is performed under temperature and pressure conditions in which the fusion fuel remains solidified. Where the capsule is formed as a unitary structure, solid fusion fuel can be introduced by filling a hollow capsule in an environment in which the fuel mixture is in a fluid, state (liquid or gas), then cooling the capsule to solidify the fuel.

Figure 18:
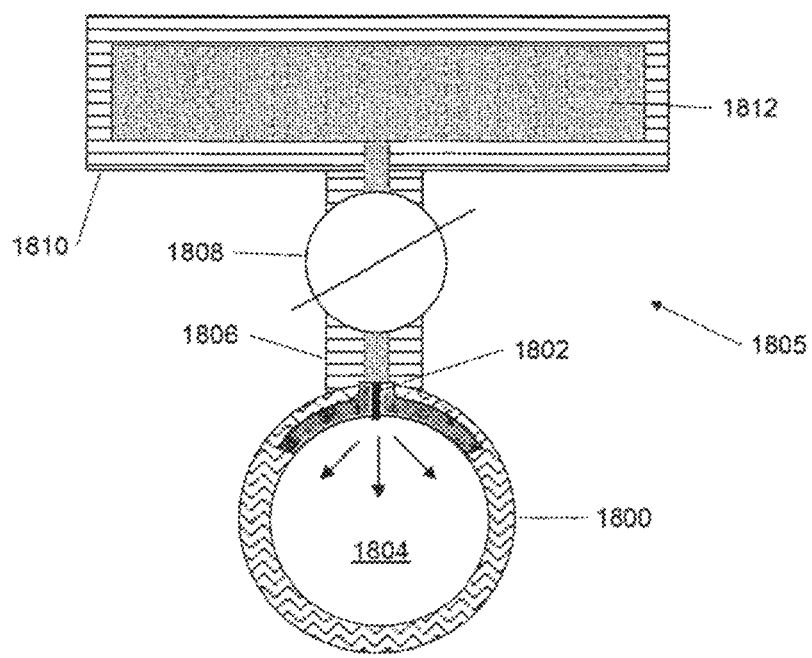
FIG. 18 is a cross-sectional view of a filling assembly for filling a capsule that has an access port according to an embodiment of the present invention.

For example, FIG. 18 is a cross-sectional view showing a filling assembly 1805 for filling a capsule 1800 that has an access port 1802 according to an embodiment of the present invention. Capsule 1800 is first brought to a desired filling temperature in a vacuum environment so that the interior 1804 is empty. The filling temperature may be any temperature at which the filling material Is in a fluid state. A filling assembly 1805 that includes a fill tube 1806, a fill valve 1808, and a fluid reservoir 1810 is connected to access port 1802, either before or after capsule 1800 is brought to the filling temperature. Fill tube 1806 is advantageously designed to make a good seal against capsule 1800 in the area of access port 1802 so that minimal fluid escapes during filling. Fluid reservoir 1810 contains the fusion fuel mixture 1812 in a fluid state. Fill valve 1806 controls the flow of fluid, through fill tube 1806.

Once fill tube 1806 is in place, the environment can be pressurized to enhance the seal between fill tube 1806 and capsule 1800. Fill valve 1808 is then opened, and a desired quantity of the fluid fusion fuel mixture 1812 is released into capsule 1800. To control the quantity of fluid delivered to capsule 1800, fill valve assembly 1808 may contain a meter, or the amount of fluid present in reservoir 1810 may be controlled, or other techniques may be used. Once the desired quantity of fluid has been delivered, fill valve assembly 1808 is closed, and capsule 1800 is cooled to a temperature at which the fusion fuel mixture 1812 solidifies. Access port 1802 may then be closed using techniques described above (e.g., filling with material, inserting a plug, or the like). Alternatively, access port 1802 can be left open in embodiments where capsule 1800 is maintained at a sufficiently low temperature and high pressure that the filling material 1810 is not lost through melting or sublimation.

7. Diffusion Techniques for Filling Capsules

In other embodiments, the interior of a capsule may be filled by diffusion of a fluid through the shell, without an access port being provided. Diffusion techniques are useful where the fluid is made of small atoms, small ions or small molecules (such as hydrogen atoms or hydrogen ions) that are capable of diffusing through the interstices of the diamond lattice. The capsule is placed into an environment containing the fluid at an appropriate temperature and pressure and allowed to reach an equilibrium state in which as many atoms are diffusing out as are diffusing in, then removed from that environment to a different environment.

In preferred embodiments, the filling temperature is higher than an ambient temperature at which the capsule is to be used; with the atomic lattice expanded at high temperature, the high-pressure fluid will diffuse through the shell with relative ease until equilibrium is reached. Once the capsule is returned to ambient conditions, the lattice will contract in the cooler temperature, so that diffusive leakage will be relatively minor.

The process can be controlled by choosing the fluid pressure, the temperature and the time period during which the diffusive transfer of the fluid takes place. The spacing of atoms in the diamond lattice will generally be different for different atoms; accordingly, the range of atoms or molecules that can be diffused into the interior of the shell, as the spacing between atoms depends upon the type of atoms in the diamond lattice.

For example, in one embodiment, the fusion fuel mixture is any of D-T, D-T-$^3$He and D-$^3$He as described above. Diffusion occurs in a pressure chamber at a pressure of around 400 atmospheres and a temperature at the capsule shell of about 600° C. These conditions are maintained for a sufficient time to allow the pressure to reach equilibrium between the interior and exterior of the shell, after which the shell is returned to room temperature (around 20° C.) and the pressure reduced.

Those of ordinary skill in the art will recognize that the technique of filling a capsule toy diffusion is also applicable to capsules that do not have a diamond lattice structure. Atoms or molecules of a fluid can diffuse through a shell having any atomic lattice as long as the lattice spacing is large enough to accommodate the fluid atoms or molecules, and the diffusion rate will depend on the size of the fluid atoms or molecules, the lattice spacing, and the thickness of the shell. For example, atoms or molecules of a fluid can be diffused into fullerenes, nanotubes, and other nanoscale shells.

III. QUALITY CONTROL

Capsules produced by any of the above or other methods are advantageously subjected to quality control measurements and modifications. Such techniques advantageously make use of scanning probe microscopy (SPM), atomic force microscopy (AFM), interference microscopy (IM), and/or acoustic wave apparatus, e.g., as described in above-referenced application Ser. No. 11/067,609 that are capable of operating at extreme temperatures. For example, where the shell contains D-T, D-T-$^3$He or D-$^3$He that includes an ice component, temperatures at or below 4 K may be required to keep the fusion fuel ice solid.

In one embodiment, an (IM) apparatus with detectors in the infrared or microwave band can be used to monitor thermal distribution or material gradients in the object, including its core. For example, in a multicomponent fusion fuel such as D-T, D-T-$^3$He or D-$^3$He, gradients in the relative concentration of different components can be detected.

In another embodiment, ultrasonic standing acoustic waves are monitored using an SPM or IM apparatus to measure minute thermal or material gradients in a sample by observing material displacement and local wavelength variations of the standing acoustic waves.

In still another embodiment, AFM-guided nanomachining at ultralow temperatures can be used to nanolap or thermally ablate fusion fuel ice in order to shape the frozen surface to a desired symmetry (or asymmetry). For example, a heated SPM tip made of diamond, titanium, platinum or other material having an affinity for hydrogen can be used for this purpose. The fusion fuel ice can be worked while it is encased in the capsule shell, provided that the capsule has access ports (or larger holes) distributed across the surface. Long SPM tips designed to extend through the access ports and reach the fuel ice inside the shell are advantageously used. After the surface has been shaped as desired, the access ports can be cleaned out (e.g., using a suitable reamer) and closed.

IV. SHIPPING AND STORING FUEL CAPSULES

In some embodiments, the capsules are designed to store the fusion fuel as a gas at high pressure (e.g., on the order of 500 atmospheres) at room temperature. When shipping or storing the capsules, it is possible that they may be exposed to temperatures considerably higher than room temperature, which could increase the internal pressure on the capsule enough to rupture, or damage the diamond shell. For instance, it is well known that a spherical shell of carbon-based diamond with a radius of 1 mm and thickness of 0.5 mm is resistant to internal pressures up to 34,542 atmospheres; thinner walled capsules would have a lower limit. By Gay Lussac's law, the ratio of pressure to temperature is constant for a gas confined to a constant volume. If the internal pressure is 500 atmospheres at room temperature (around 20° C.), then at around 100° C., the internal pressure would near the limit for carbon-based diamond. If the pressure at room temperature is around 50 atmospheres, then the capsule would remain intact at temperatures up to about 750° C.

It is desirable to ship and store fusion fuel capsules at room temperature rather than using special cryogenic equipment. In addition, to prevent damage due to fire or other heat exposure, the capsule should be impervious to high temperatures (e.g., up to 1000° C.) during shipping and storage.

Figure 19:
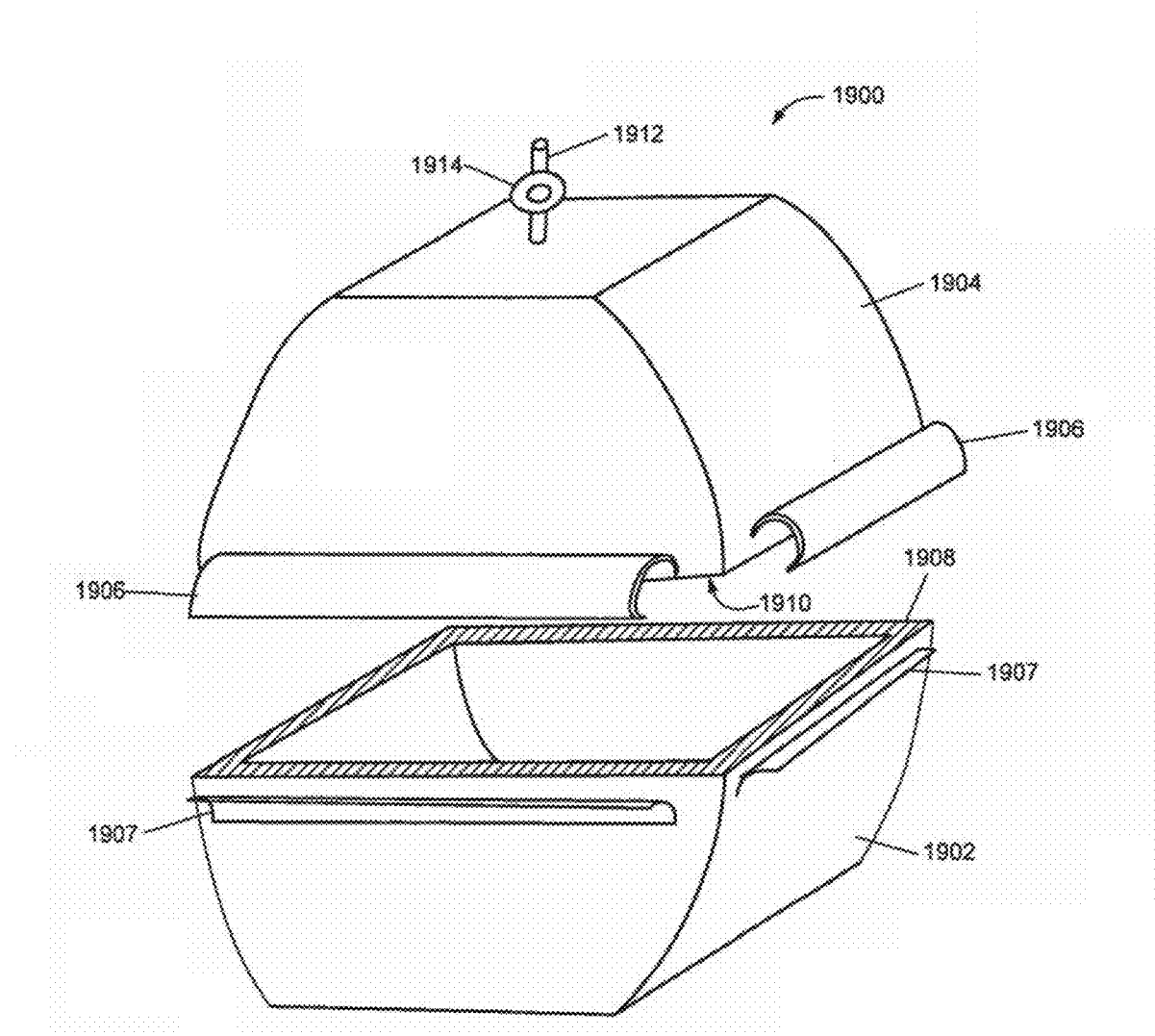
FIG. 19 is a perspective view of a storage container for fuel-containing capsules according to an embodiment of the present invention.

To simplify shipping and storage of fusion fuel capsules, the present invention provides a shipping and storage container adapted to the purpose. FIG. 19 is a perspective view of a storage container 1900. A base member 1902 and a lid member 1904 can be attached to each other via complementary latch members 1906, 1907. The respective contact surfaces 1908, 1910 of base member 1902 and lid member 1904 are advantageously rubberized or otherwise adapted to form a substantially airtight seal so that the inside of container 1900 can be pressurized when container 1900 is closed. When closed, the interior of container 1900 provides enough volume to store one or more fuel-filled diamond capsules. If multiple capsules are to be stored, the interior may be divided into sections (not shown), e.g., by perforated or permeable wall, with one capsule being stored in each section, or multiple capsules may be stored together in contact with each other.

The outer walls and seals of base member 1902 and lid member 1904 are advantageously made of a high-temperature ceramic such as aluminum oxide or silicon carbide and are advantageously thick enough to sustain an internal pressure in excess of 50,000 atmospheres at a temperature of 1000° C. and to resist impact forces exceeding 50 times gravity (50 g).

Lid member 1904 includes a tube 1912 and valve 1914. When container 1900 is closed, its interior can be pressurized by connecting a source of high-pressure gas (or other fluid) to tube 1912 and opening valve 1914 to allow the gas to flow into container 1900. When the desired pressure has been reached, valve 1914 is closed and tube 1912 is disconnected from the source of high-pressure gas. In some embodiments, a pressure gauge may be mounted on tube 1912 or elsewhere on container 1900, allowing the internal pressure to be continuously monitored, regardless of whether tube 1912 is connected to an external source of high-pressure gas.

In one embodiment, one or more capsules filled with fusion fuel are placed in container 1900 at a low temperature (e.g., between zero and 10 K). Container 1900 is then pressurized to a pressure corresponding to about 300 atmospheres at room temperature by introducing hydrogen, then removed from the low-temperature environment. Pressurizing container 1900 with hydrogen advantageously reduces diffusion of the fuel mixture out of the capsules during storage, but it will be appreciated that other gases or gas mixtures may also be used. Container 1900 can then be transported and stored anywhere on earth without requiring additional equipment to maintain a cryogenic or pressurized environment.

VI. GENERATION OF NUCLEAR FUSION

According to another aspect of the present invention, a fuel-containing diamond capsule is used in an indirect-drive inertial confinement fusion (ICF) reactor. In such systems, the diamond shell is exposed to x-ray radiation that heats the shell. The diamond shell expands outward, driving an implosion of its contents. If the implosion reaches sufficient temperature and density, a fusion reaction will be initiated.

Figure 20A:
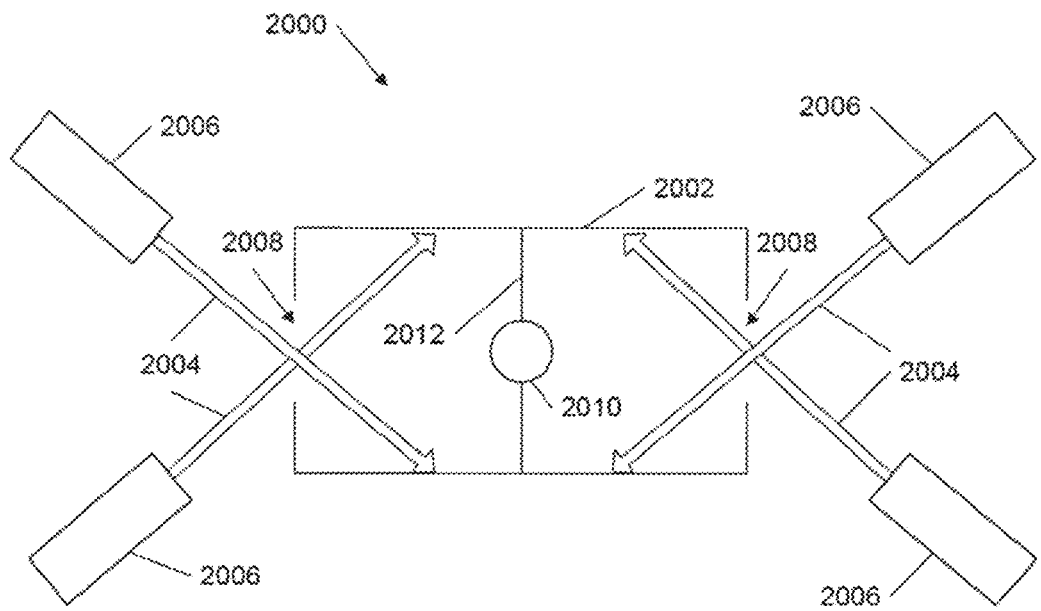
FIGS. 20A and 20B are cross-sectional views of fusion reactors according to embodiments of the present invention.

FIG. 20A is a cross-sectional view of an indirect-drive ICF reactor 2000 according to an embodiment of the present invention. Fusion reactor 2000 includes a hohlraum 2002, which is a cavity with walls made of a high-Z material (e.g., gold, lead, or uranium). Optical apertures 2000 are provided at either end of hohlraum 2002 to permit entry of laser beams 2004 generated by laser sources 2006, and hohlraum 2002 is configured to radiate x-rays when heated by laser beams 2004. In some embodiments, multiple laser sources 2006 are used; in other embodiments, one laser source generates multiple beams 2004 (e.g., by using beam splitters) that are directed into hohlraum 2002 from different directions using suitable optical elements as is known in the art. Laser beams 2004 are advantageously arranged symmetrically, so that the walls of hohlraum 2002 are approximately uniformly heated. Hohlraum 2002, laser sources 2006, and optical components for directing laser light 2004 from laser sources 2006 onto the walls of hohlraum 2002 may be of generally conventional design.

In the center of hohlraum 2002 is a fuel capsule 2010 held in place by a support web 2012. Capsule 2010 is advantageously a diamond-shell capsule containing a fusion fuel mixture such as D-T, D-T-$^3$He or D-$^3$He. Any of the capsule structures described above or other similar structures may be used as capsule 2010, and any of the fabrication techniques described herein or other techniques may be used to fabricate capsule 2010 and fill it with the fusion fuel mixture.

In one embodiment, fusion reactor 2000 is implemented on a size scale comparable to that of the National Ignition Facility. For example, fuel capsule 2010 may be a sphere with a radius of about 1 mm and a thickness of 50 to 500 µm; the fusion fuel may include a layer of fuel ice lining the inner surface of capsule shell 2010 and fuel gas filling the interior. Laser sources 2006 may provide a total energy of around 1.8 megajoules (MJ) and power output of around 500 terawatts (TW).

In other embodiments, the reactor can be scaled down in size. For instance, fuel capsule 2010 can be made with a diameter of 20 µm or less and a thickness of about 0.5-5 µm or less. A smaller hohlraum, requiring less laser energy, can then be used. In one such embodiment, reducing the capsule diameter by a factor of 100 reduces the input energy requirement by a factor of about $10^6$.

Figure 20B:
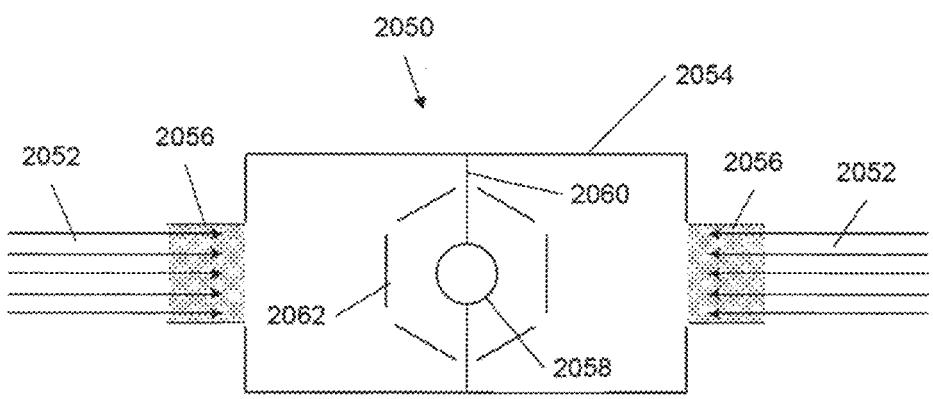

FIG. 20B is a cross-sectional view of ah indirect-drive ICF reactor 2050 according to another embodiment of the present invention. Fusion reactor 2050 is somewhat similar to fusion reactor 2000 of FIG. 20A, except that the energy in reactor 2050 is supplied by ion beams 2052 incident on either end of a hohlraum 2054. Hohlraum 2054 includes absorber sections 2056 at either end that absorb the ions and radiate electromagnetic energy into hohlraum 2054 to produce x-ray radiation in the cavity.

In the center of hohlraum 2054 is a fuel capsule 2058 held in place by a support web 2060. Like capsule 2010 (FIG. 20A), capsule 2058 is advantageously a diamond-shell capsule containing a fusion fuel mixture such, as D-T, D-T-$^3$He or D-$^3$He. Any of the capsule structures described herein or other similar structures may be used as capsule 2058, and any of the fabrication techniques described herein or other techniques may be used to fabricate capsule 2058 and fill it with the fusion fuel mixture.

A symmetry shield 2062 is advantageously provided to redirect the electromagnetic energy from absorber sections 2056 away from capsule 2058 toward the walls of hohlraum 2054 to provide more uniform x-ray heating of capsule 2058.

Like fusion reactor 2000, fusion reactor 2050 can be implemented on various size scales, with capsule diameters ranging from 20 µm or less up to 2 mm or more.

It will be appreciated that the fusion reactors described herein are illustrative and that variations and modifications are possible. Different fusion fuel mixtures may be substituted for those described herein, and the capsule dimensions (thickness, outer diameter, and so on) may vary.

VII. CONCLUSION

While the invention has been described with respect to specific embodiments, one skilled in the art will recognize that numerous modifications are possible. One skilled in the art will also recognize that the present invention provides a number of advantageous techniques, tools, and products, usable individually or in various combinations. These techniques, tools, and products include but are not limited to:

formation of a sphere, capsule or pellet for containing nuclear fusion fuel using any or all of the following: (a) molding or form coating of CVD or PECVD diamond to form parts of a capsule or pellet; (b) construction of a sphere by the accumulation of polycrystalline, stress relieved amorphous or homeoepitaxial diamond; (c) construction of a hollow sphere by the accumulation of polycrystalline, stress relieved amorphous or homeoepitaxial diamond; (d) construction of a sphere by the accumulation of polycrystalline, or homeoepitaxial silicon carbide; and (e) construction of a hollow sphere by the accumulation of polycrystalline, or homeoepitaxial silicon carbide; and/or a sphere, capsule or pellet for containing nuclear fusion fuel where the inner surface is smoothed by the form or mold; and/or a sphere, capsule or pellet for containing nuclear fusion fuel where the form or mold is used as a support and/or holder to complete modifications of and additions to the outer surface; and/or a sphere, capsule or pellet for containing nuclear fusion fuel in which the outer surface is smoothed by the mold or form; and/or a sphere, capsule or pellet for containing nuclear fusion fuel in which the form or mold is used as a support and/or holder to complete modifications of and additions to the inner surface; and/or assembly of a capsule for containing nuclear-fusion fuel using interference fits, locking clips or any structure molded, formed or machined into sections of the diamond shell; and/or assembly of capsules for containing nuclear fusion fuel using an adhesion layer on the diamond plus other materials to bond the sections of the capsule; and/or assembly of capsules for containing nuclear fusion fuel using an inert gas solid at temperatures below the inert gas melting point; and/or a hollow precision sphere or other shape for containing nuclear fusion fuel formed by growing diamond on a ball form made or coated by any of silicon, silicon dioxide (including quartz), silicon carbide, silicon nitride, titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, a suitable glass, aluminum oxide (including alumina), or any material on which diamond can be grown, where after growth the interior material is etched out through one or more openings or holes in the diamond material; and/or a diamond sphere for containing nuclear fusion fuel grown on a ball form or mold in which the diamond coated ball is processed to external dimensions and finishes of any given precision; and/or a diamond sphere for containing nuclear fusion fuel formed by a growth process in which the ball form is rotated during diamond growth to promote even coating of the form with the diamond film; and/or a diamond sphere for containing nuclear fusion fuel formed by a process in which a hollowed diamond sphere with one or more openings is returned to the growth environment and diamond is grown until the sphere is complete (without any openings) to obtain a continuous hollow diamond sphere; and/or processing a surface of a hollow diamond sphere to any degree of precision to obtain a precise hollow, diamond spherical shape for containing nuclear fusion fuel; and/or a closed shape for containing nuclear fusion fuel, the shape being made of diamond grown on seeded substrate material that is supported by support structures to promote growth of diamond material over the entire structure except in the vicinity of the support(s), where the substrate material can be removed mechanically or by an etchant; and/or a closed shape for containing nuclear fusion fuel, the shape being made of diamond grown on substrate material supported by support structures in which the support holes are reduced in size by additional diamond growth to 5 micron or less openings; and/or a closed shape for containing nuclear fusion fuel, the shape being made of diamond grown on substrate material supported by support structures in which the diamond has been partially or fully boron doped and in which the shape is electrically charged such that in the region around the holes diamond growth is promoted while elsewhere it is inhibited; and/or a closed shape for containing nuclear fusion fuel, the shape being made of diamond grown on substrate material supported by support structures in which the diamond has been partially or fully boron doped and in which the shape is charged so as to promote growth everywhere except in the holes; and/or a closed shape as described above in which a mechanical means, magnetic field means or chemical means prevents the growth of boron doped diamond around the holes; and/or a closed shape as described above in which the boron is removed by chemical or mechanical means after the shape is coated with the boron coating; and/or a closed shape for containing nuclear fusion fuel, the closed shape made of diamond with an electrically conductive additive, in which the electrically conductive additive to the diamond is nitrogen; and/or a closed shape for containing nuclear fusion fuel, the closed shape made of diamond with an electrically conductive additive, in which the electrically conductive additive is any suitable conductivity inducing material, including various forms of carbon; and/or a shell such as described above in which the coating built up to compose the shell is boron carbide and/or boron nitride and/or silicon carbide and/or silicon nitride and/or tantalum carbide and/or tantalum nitride and/or tungsten carbide and/or tungsten nitride and/or any other obdurate material capable of being formed to extremely high finishes and tolerances; and/or a shell such as described above in which the holes are narrowed by the control of growth temperature and heat applied to the shell; and/or a shell such as described above in which the holes are narrowed to a diameter of 5 microns or less along some portion of their length; and/or any machined, molded or formed plug used to plug up the holes created in the grown diamond shell; and/or a process of building a rough mold or form out of alumina or quartz, then putting an appropriate hard film on the formed alumina or quartz, followed by further lapping and polishing to bring this surface to a desired accuracy and resolution for purposes of growing a diamond shell, where holes to the hard inner film or to the alumina or quartz are preserved during diamond growth, and after diamond growth etching is used to remove the alumina or quartz while other etch means (e.g., a dry etch) are used to remove other coatings such as silicon nitride or silicon carbide; and/or a process of correcting condensed fusion fuel (which may contain, e.g., deuterium and/or tritium and/or $^3$He) in gas or ice states by methods described herein (ASM, heating of just the tip area around the point of the tip etc,) in conjunction with long cantilevers which can reach by rotation of the ball into all the interior surface; and/or a hollow diamond shell as described herein in which the holes through which the shell's interior was etched are grown closed in an atmosphere of deuterium and/or tritium and/or $^3$He and optionally also including compounds of carbon, capturing the high-pressure fluid in the interior of the shell; and/or a hollow diamond shell as described herein, in which very small holes are made in the sphere by any means including laser, or femtolaser machining, conventional machining or AFM guided nanomachining; and/or a hollow diamond shell filled with high-pressure fusion fuel, where the high pressure is at least 500 atmospheres or more; and/or a hollow diamond shell filled with fusion fuel, in which fusion ignition is obtained by use of a small compact optical and/or x-ray and/or other energy source; and/or a hollow diamond capsule filled with high-pressure fusion fuel, in which the hollow diamond capsule is less then 20 microns in diameter; and/or a hollow diamond capsule filled with high-pressure fusion fuel in which the capsule is greater then 20 microns in diameter; and/or a fusion fuel capsule having a diamond shell that is coated with silicon carbide, either directly or over an intervening layer; and/or a fusion fuel capsule having a diamond shell that is coated with any or all of silicon carbide, silicon, silicon dioxide (quartz), silicon fluoride, magnesium fluoride, silicon nitride, titanium, titanium dioxide, carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide; and/or any diamond structures for containing nuclear fusion fuel where the structures are stabilized and strengthened by being layered or incorporated into layers of silicon carbide; and/or any device, structure or mechanism usable for containing nuclear fusion fuel, the structure being composed in whole or part of diamond stabilized by silicon carbide and/or coated with layers in any order consisting of any or all of silicon carbide, silicon, silicon fluoride, magnesium fluoride, silicon nitride, titanium, titanium dioxide, carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, aluminum, oxide, or any stable oxide, any stable fluoride, or any stable nitride; and/or a fusion-fuel-containing diamond capsule with a mechanism to allow only one way flow into the capsule and/or a valve for a fusion-fuel-containing diamond capsule using a double tapered single crystal diamond structure; and/or a solid or hollow diamond structure for containing nuclear fusion fuel in which the shape is obtained in whole or in part by direct machining or lapping; and/or a diamond part, including hollow diamond spheres for containing nuclear fusion fuel, in which the diamond mass and shape are the principal mechanical, electrical, optical and/or thermal load bearing members of the part; and/or a diamond part, including diamond spheres for containing nuclear fusion fuel, in which the structural diamond is engineered to engage a core material by deformation when a load limit is reached; and/or diffusion control of hydrogen and/or its isotopes and/or $^3$He and/or other fluid atoms or molecules to increase or decrease the amount of such material inside a diamond form, where the diamond form might be carbon-diamond or any other material or combination of materials; and/or diffusion control of hydrogen and/or its isotopes and/or $^3$He and/or other fluid atoms or molecules into a diamond form that includes carbon and any other material or combination of materials; and/or diffusion control of hydrogen and/or its isotopes and/or $^3$He and/or other fluid atoms or molecules into a diamond form in which the diamond material is polycrystalline diamond with single or multiple crystal sizes from 100 nm to 4 or 5 angstroms.

Thus, although the invention has been described with respect to specific embodiments, it will be appreciated that the invention is intended to cover all modifications and equivalents within the scope of the following claims.

What is claimed is:

1. An article of manufacture, comprising:
   a shell substantially enclosing an interior region, the shell comprising
      a polycrystalline diamond layer;
   at least one opening in the shell; and
   at least one of:
      at least one sealable member configured to be capable of closing the opening; and
      at least one fill tube configured to form a seal to the at least one opening in the shell,
   wherein the polycrystalline diamond layer is formed by a plasma process and having a surface smoothness with deviations less than 4 nm,
   wherein the polycrystalline diamond layer is formed of nanoscale crystal grains having an average value of a major axis of the crystal grains of 100 nm or less.

2. The article of claim 1, wherein the shell is formed by a microwave plasma process.

3. The article of claim 1, wherein a length of the interior region is between 0.9 mm and 1.95 mm.

4. The article of claim 1, wherein the interior region is filled with solid or fluidic material differing from a substrate around which the shell was formed.

5. The article of claim 1, wherein the interior region is filled by at least one fusion fuel selected from deuterium and tritium.

6. The article of claim 5, wherein the at least one fusion fuel selected from deuterium and tritium is pressurized to greater than 1 atm.

7. The article of claim 1, including a sealable member, wherein the sealable member comprises a diamond material.

8. The article of claim 1, wherein the shell has a thickness of 50-500 μm.

9. The article of claim 1, wherein the polycrystalline diamond layer further comprises a dopant.

10. The article of claim 9, wherein the dopant is at least one element selected from a list consisting of: boron, and nitrogen.

11. The article of claim 1, the polycrystalline diamond layer being formed by a microwave plasma process;
    and wherein a length of the interior region is between 0.9 and 1.95 mm.

12. The article of claim 11, wherein the interior region is filled with solid or fluidic material differing from a substrate around which the shell was formed.

13. The article of claim 11, wherein the interior region is filled by at least one fusion fuel selected from deuterium and tritium.

14. The article of claim 13, wherein the at least one fusion fuel selected from deuterium and tritium is pressurized to greater than 1 atm.

15. The article of claim 11, including a sealable member, wherein the sealable member comprises a diamond material.

16. The article of claim 11, wherein the shell has a thickness of 50-500 μm.

17. The article of claim 16, wherein the polycrystalline diamond layer further comprises a dopant.

18. The article of claim 17, wherein the dopant is at least one element selected from a list consisting of: boron, and nitrogen.

19. The article of claim 1,
    including a sealable member, wherein the interior region is filled by at least one fusion fuel selected from deuterium and tritium, and wherein the sealable member comprises a diamond material.

20. The article of claim 19, wherein the plasma process forming the shell is a microwave plasma process.

21. The article of claim 19, wherein the at least one fusion fuel selected from deuterium and tritium is pressurized to greater than 1 atm.

22. The article of claim 20, wherein a length of the interior region is between 0.9 mm and 1.95 mm.

23. The article of claim 22, wherein the shell has a thickness of 50-500 μm.

24. The article of claim 23, wherein the polycrystalline diamond layer further comprises a dopant.

25. The article of claim 24, wherein the dopant is at least one element selected from a list consisting of: boron, and nitrogen.

26. An article of manufacture, comprising:
a shell substantially enclosing an interior region, the shell comprising
a polycrystalline diamond layer;
at least one opening in the shell; and
at least one of:
at least one sealable member configured to be capable of closing the opening; and
at least one fill tube configured to form a seal to the at least one opening in the shell,
the polycrystalline diamond layer being formed by a plasma process and having a surface smoothness with deviations less than 4 nm;
wherein the polycrystalline diamond layer is formed of nanoscale crystal grains having an average value of a major axis of the crystal grains of 100 nm or less, and wherein the shell has a thickness of at least 50 μm.

27. The article of claim 26, wherein the plasma process forming the shell is a microwave plasma process.

28. The article of claim 26, wherein a length of the interior region is between 0.9 mm and 1.95 mm.

29. The article of claim 26, wherein the interior region is filled with solid or fluidic material differing from a substrate around which the shell was formed.

30. The article of claim 26, wherein the interior region is filled by at least one fusion fuel selected from deuterium and tritium.

31. The article of claim 30, wherein the at least one fusion fuel selected from deuterium and tritium is pressurized to greater than 1 atm.

32. The article of claim 26, including a sealable member, wherein the sealable member comprises a diamond material.

33. The article of claim 26, wherein the shell has a thickness of at least 50-500 μm.

34. The article of claim 26, wherein the polycrystalline diamond layer includes a dopant.

35. The article of claim 34, wherein the dopant is at least one element selected from a list consisting of: boron, and nitrogen.

36. A capsule usable in an inertial confinement fusion reactor comprising:
a shell substantially enclosing an interior region,
wherein the shell is spherical shell having concentric interior and exterior surfaces wherein, except for at least one opening in the shell forming at least one access port, the shell has a maximum deviation in thickness between interior and exterior surfaces of less than 200 nm, and local deviations from smoothness on the inner and outer surfaces on the shell are less than 4 nm,
the shell comprising
a polycrystalline diamond layer;
the at least one opening in the shell forming at least one access port;
and at least one of:
a sealable member configured to be capable of closing the at least one opening; and
a fill tube configured to form a seal to the at least one opening in the shell.

37. The capsule of claim 36, wherein the shell is formed by a plasma process.

38. The capsule of claim 36, wherein the polycrystalline diamond layer is formed of crystal grains that have an average value of a major axis of the crystal grains of 100 nm or less.

39. The capsule of claim 36, wherein the capsule is filled with at least one fusion fuel comprising deuterium and/or tritium that is pressurized to greater than 1 atm.

40. The capsule of claim 36, wherein the polycrystalline diamond layer further comprises a dopant.

41. The capsule of claim 40, wherein the dopant is at least one element selected from among boron and nitrogen.

* * * * *